(12) United States Patent
Fujiwara et al.

(10) Patent No.: US 6,454,287 B1
(45) Date of Patent: *Sep. 24, 2002

(54) BICYCLE

(75) Inventors: Nobuhiro Fujiwara, Kanagawa; Atsushi Mamiya, Tokyo, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/328,412

(22) Filed: Jun. 9, 1999

(30) Foreign Application Priority Data

Jun. 12, 1998 (JP) .......................................... 10-165108

(51) Int. Cl.⁷ ................................................ B62M 1/04
(52) U.S. Cl. ...................................... 280/252; 280/259
(58) Field of Search ................................. 280/252, 253, 280/254, 255, 256, 257, 258, 259

(56) References Cited

U.S. PATENT DOCUMENTS

| | | | |
|---|---|---|---|
| 1,505,271 A | * | 8/1924 | McNeil |
| 1,577,585 A | * | 3/1926 | Montiglio |
| 2,424,639 A | * | 7/1947 | Sobirai |
| 4,226,131 A | * | 10/1980 | Yamasaki ..................... 474/82 |
| 4,782,431 A | * | 11/1988 | Park ............................ 362/161 |
| 6,209,900 B1 | * | 4/2001 | Yoshizawa |

FOREIGN PATENT DOCUMENTS

| | | |
|---|---|---|
| FR | 842.114 | 6/1939 |
| FR | 2 744 691 | 8/1997 |
| FR | 2 745 783 | 9/1997 |
| GB | 256100 | 8/1926 |

* cited by examiner

Primary Examiner—Kevin Hurley
(74) Attorney, Agent, or Firm—Sonnenschein, Nath & Rosenthal

(57) ABSTRACT

This invention relates to a bicycle having a driving force transmitting mechanism with oscillating fulcrum point. A crank lever is connected between a sprocket and the one of pedal levers. When a rider steps on the pedals alternatively, force of the pedal levers generated by the oscillation of the pedal levers is transmitted to the sprocket through the crank lever. When the pedal levers oscillate, an oscillating fulcrum point of the pedal lever is moved, not fixed, in a lateral direction within the sliding part. The rotating force of the sprocket is transmitted to the rear wheel through a chain. With such an arrangement, a configuration of the rotating force transmitting mechanism for the rear wheel is simplified. Even if the locus Q of motion of the pedal is different in the first half period (a stepping-on period) and the second half period (a stepping-up period), a smooth rotation of the pedal is assured.

53 Claims, 32 Drawing Sheets

BICYCLE

RELATED APPLICATION DATA

The present application claims priority to Japanese Application No. P10-165108 filed Jun. 12, 1998, which application is incorporated herein by reference to the extent permitted by law.

BACKGROUND OF THE INVENTION

1. Technical Field

This invention relates generally to a bicycle having a rotating force transmitting mechanism with an oscillating fulcrum point. More particularly, the invention relates to the bicycle wherein a crank lever is arranged between a sprocket and a pedal lever to transmit force applied to the pedal lever to the sprocket, and the oscillating fulcrum point of the pedal lever is slidable.

2. Related Art

The conventional bicycle is operated such that the crank-like pedals fixed at both sides of a shaft of the sprocket with a phase difference of 180° are stepped on by a rider. The pedal lever is rotated around the shaft of the sprocket to attain rotating force of the sprocket and this rotating force of the sprocket is transmitted to the rear wheel through the chain.

However, in recent development of the bicycle, there has been proposed to provide a bicycle having a driving force generating device with an oscillating fulcrum point, whereby the rider is less fatigued with a riding as compared with the conventional bicycle, and desired propulsion force can be attained.

FIG. 1 schematically shows a configuration of the related art bicycle having the driving force generating device with an oscillating fulcrum point. In FIG. 1, a bicycle 60 having the rotating force transmitting mechanism with the oscillating fulcrum point is constructed such that respective a front wheel 61 and a rear wheel 62 acting as moving wheel are attached to a pair of delta-shaped frames 63, 64, a handle 65 is attached to a front frame 63 and a saddle 66 is fixed to a rear frame 64. These members are constructed in the same manner as the conventional bicycle.

A wheel shaft 61a of the front wheel 61 is rotatably attached to the extremity ends of a fork section 67a formed at the lower part of a handle frame 67. Connecting portion 63a constituting the front frame 63 is extended longitudinally in a reverse direction which the bicycle is headed, from a holding part 63c holding the handle frame 67 rotatably. Connecting portion 63b also constituting the front frame 63 is extended in a rearward and downwardly slanting direction from the holding part 63c. The extremity ends of these connecting portions 63a, 63b are connected to a saddle frame 64c. The saddle frame 64c constitutes the rear frame 64 and is substantially in parallel with the handle frame 67. The saddle 66 is fixed to this saddle frame 64c.

Respective connecting portions 64a and 64b constituting the rear frame 64 are extended from the connecting portions 63a and 63b. The extremity ends of these connecting portions 64a, 64b are connected to each other to hold the wheel shaft 62a of the rear wheel 62 horizontally. Respective gears 75R and 75L (not shown) are attached and fixed to both ends of the wheel shaft 62a. FIG. 1 illustrates the configuration of the bicycle in which only the gear 75R at the right side toward a direction which a bicycle is headed, is shown.

The gear 75R is engaged with a gear train, not shown, and the crank 76R is fixed for transmitting its rotating force to the gear 75R through the gear train. A crank pin 77R is fixed to a position displaced in respect to a shaft 78R of the crank 76R. A right side pedal lever 72R holds rotatably the crank pin 77R so that the crank 76R may be rotated with the crank pin 77R.

The right side pedal lever 72R attaches a right side pedal 71R rotatably at a front end thereof. The pedal lever 72R attaches a roller 73R pivotally at a rear end thereof. The roller 73R is freely slid in a guiding groove 74R formed near the wheel shaft 62a.

The pedal lever 72R acts as a lever oscillating up and down with the roller 73R pivoted at the pedal lever 72R being applied as a fulcrum point.

When the rider steps on the pedal 71R acting as a force applying point, the pedal 71R is moved in a counterclockwise direction along a locus S approximating to a flat ellipse shape. At the same time, the pedal lever 72R is moved up and down in a predetermined angle with the roller 73R being applied as a fulcrum point.

This motion allows the crank 76R to rotate in a counterclockwise direction around the shaft 78R through the crank pin 77R acting as a lever force applying point of the pedal lever 72a. At this time, the roller 73R acting as a fulcrum point for the pedal lever 72R is slid (moved) laterally within the guiding groove 74R. That is, the roller 73R acts as an oscillating fulcrum point for the pedal lever 72R.

While the crank 76R is rotated, the rotating force of the crank 76R is transmitted to the gear 75R through the gear train. A clockwise directional rotation of the gear 75R causes the wheel shaft 62a of the rear wheel 62 to rotate for obtaining propulsion force of the bicycle 60. The propulsion force enables the bicycle 60 to run.

Since a left-side pedal lever 72L (not shown) is provided with the same driving force transmitting mechanism as that of the right side pedal lever 72R described above, a rider steps on the pedals 71R and 71L (not shown) alternatively by his (her) right and left feet to obtain propulsion force for the bicycle 60. Thereby, the bicycle 60 may run.

The configuration of the aforesaid bicycle 60, however, requires that the rotating force transmitting mechanisms for use in rotating the rear wheel 62 such as the crank 76R, the gear 75R and the guiding groove 74R constituting the driving force inputting device with an oscillating fulcrum point, are arranged specially at both sides of the frames 63, 64. Due to this fact, such the bicycle has a problem that the number of component parts constituting the bicycle has been increased so that the manufacture of the bicycle has cost up and the body weight of the bicycle 60 is increased.

SUMMARY OF THE INVENTION

The object of the present invention is to provide a less-expensive and light weight bicycle in which the configuration of the rotating force transmitting mechanism is made simple and the number of component parts is reduced, and further a smooth locus Q of motion of the pedal can be assured and at the same time rotating force of the sprocket is transmitted efficiently when an oscillating range of the pedal lever is reduced.

In carrying out the invention in one preferred mode, we provide a bicycle comprising a frame constituting a chassis, a pair of moving wheels rotatably arranged at a front side and a rear side of the frame, a sprocket arranged near a bottom bracket point in the frame, driving force transmitting means for transmitting rotating force of the sprocket to the rear wheel, a pair of pedal levers having a phase difference of 180° with respect to each other to oscillate alternatively up and down, a crank lever arranged between the sprocket and the one pedal lever so as to transmit force of the pedal lever to the sprocket, and a sliding part for acting as an oscillating fulcrum point of the pedal lever.

A sliding pin arranged at one end of the pedal lever is slid within the sliding part while the pedal lever is oscillated. The force accompanied by the oscillation of the pedal lever is transmitted to the rear wheel through the sprocket.

In the present invention, force applied to the pedal by the rider is transmitted to the rear wheel under utilization of the crank lever, the sprocket and the chain. Namely, the force of the pedal lever is transmitted to the sprocket through the crank lever. The oscillating fulcrum point of the pedal lever is moved, not fixed, laterally in the sliding part.

With such an arrangement, the configuration of the driving force transmitting mechanism for the rear wheel is simplified. This causes the bicycle according to the invention to be light in its weight, and then rotating force of the sprocket is transmitted efficiently when an oscillating range of the pedal lever is reduced.

Then, as the pedal lever is stepped on by the rider, the oscillating fulcrum point is moved laterally, so that when the locus of motion of the pedal is different in reference to the first half period (from the upper dead center to the lower dead center) and the second half period (from the lower dead center to the upper lower center), a smooth motion of the pedal is obtained.

A further understanding of the nature and advantages of the invention may be realized by reference to the following portion of the specification and drawings.

DESCRIPTION OF THE PREFERRED EMBODIMENT

Figure 1:
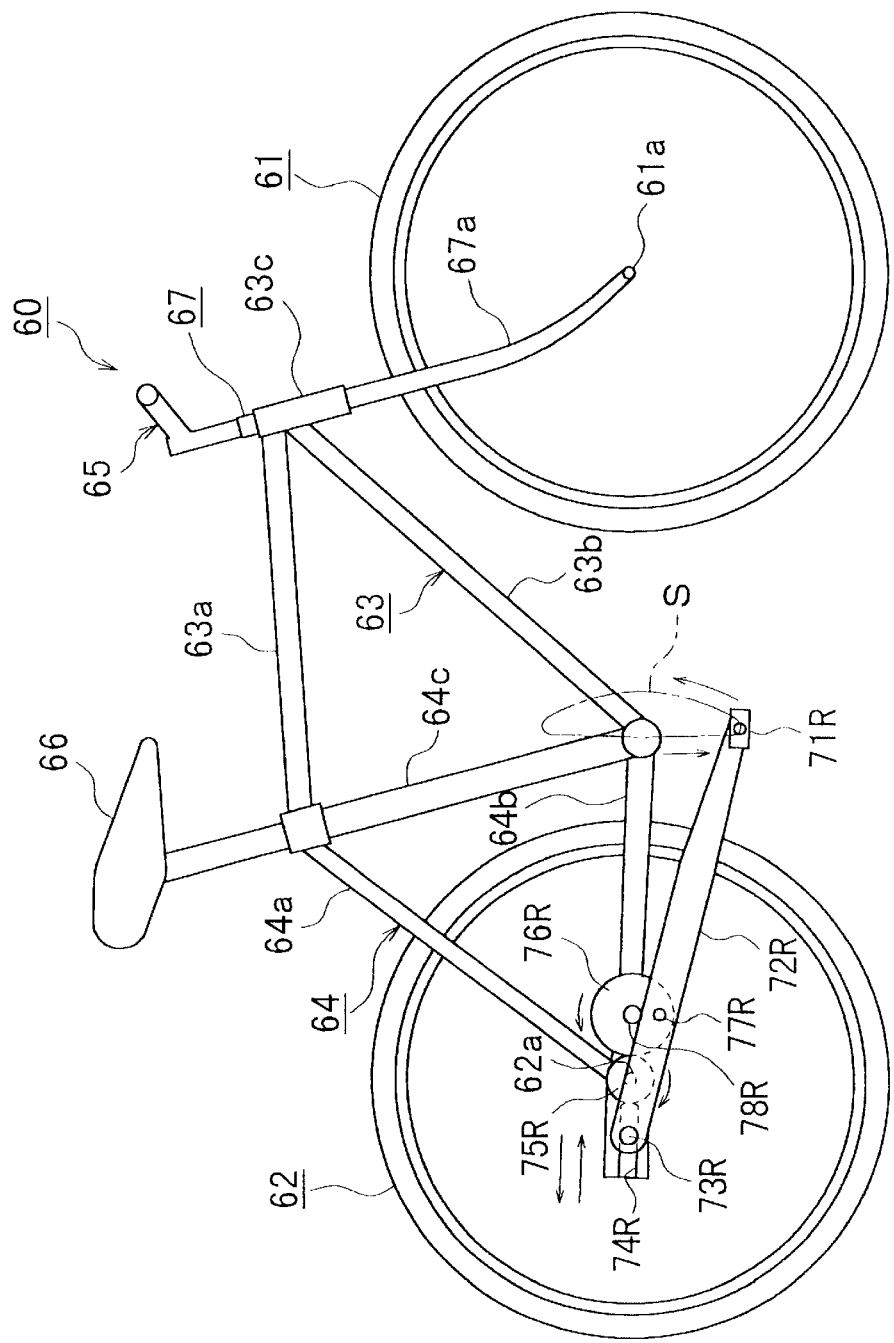
FIG. 1 illustrates a configuration of the bicycle of the related art.
Figure 2:
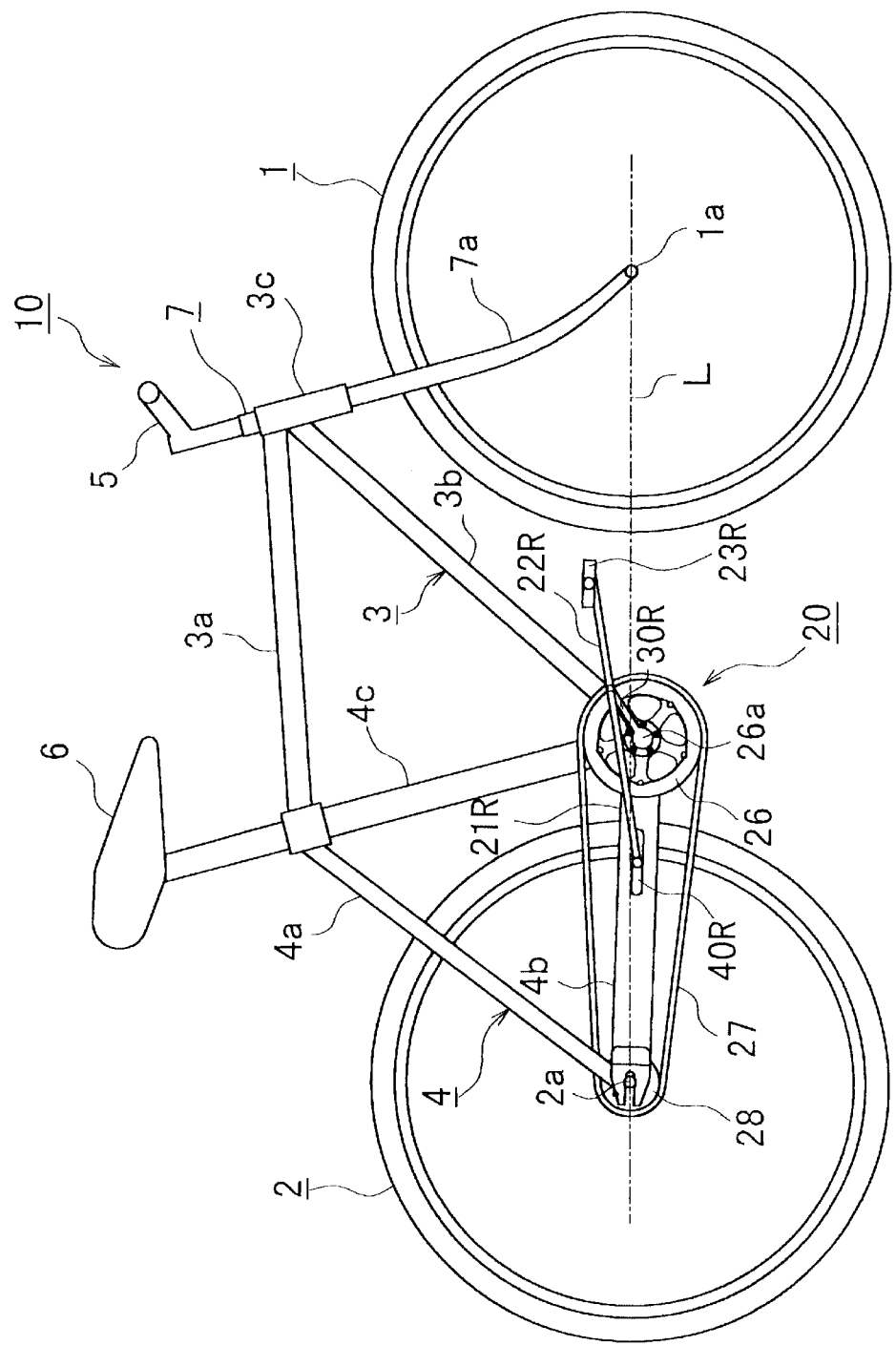
FIG. 2 shows a side elevational view illustrating a configuration of a bicycle having rotating force transmitting mechanism with an oscillating fulcrum point, as a preferred embodiment of the invention.

Referring now to the drawings, some preferred embodiments of the present invention will be described. FIG. 2 shows a configuration of a bicycle 10 using a rotating force transmitting mechanism 20 with an oscillating fulcrum point, as a preferred embodiment.

As shown in FIG. 2, the bicycle 10 is constructed such that a front wheel 1 and a rear wheel 2 acting as moving wheels are connected by a pair of delta-shaped frames 3, 4. A handle 5 is also fixed on the front frame 3 and a saddle 6 is fixed on the rear frame 4. These parts are connected and fixed in the same manner as the existing bicycle.

A wheel shaft 1a of the front wheel 1 is rotatably attached to an extremity end of a fork segment 7a formed at the lower part of a handle frame 7. A handle 5 acting as a steering device is attached to an upper part of the handle frame 7.

Respective connecting portions 3a, 3b constituting the front frame 3 are extended laterally and along an inclined downward direction from a holding section 3c rotatably holding the handle frame 7. The extremity ends of these connecting portions 3a, 3b are coupled to a saddle frame 4c constituting the rear frame 4. The saddle frame 4c is substantially in parallel with the handle frame 7. The saddle 6 is fixed to the saddle frame 4c so that a riding-on height of a bicycle rider can be properly adjusted as necessary.

Respective connecting portions (connecting frames) 4a, 4b constituting the rear frame 4 are extended along an inclined downward direction and laterally from the two connecting portions 3a, 3b. The extremity ends of these connecting portions 4a, 4b are connected to each other to hold a wheel shaft 2a of the rear wheel 2 in a horizontal state. A gear 28 is fixed to the wheel shaft 2a. The force of a sprocket 26 generated by oscillations of a pedal lever 22R is transmitted to the gear 28 through a chain 27. In the example shown in FIG. 2, a shaft 26a of the sprocket 26 is set at a bottom bracket point (a crossing point between the frames 3b and 4c).

In this case, the pedal lever is a linear lever (a pedal arm). A pair of pedal levers 22R and 22L are fixed to the right and left sides of the sprocket 26 with a phase difference of 180°, respectively.

FIG. 2 illustrates a case that the sprocket 26 is fixed on the right side toward a direction in which the bicycle is headed, in respect to each of the frames 3, 4. An end of a crank lever (a crank arm) 30R is fixed to the shaft 26a of sprocket 26 and the other end thereof is rotatably hold to the pedal lever 22R. When the rider steps on a pedal 23 (23R in the case shown in FIG. 2), force applied to the pedal lever 22R is transmitted to the sprocket 26 through this crank lever 30R.

The pedal lever 22R is equipped with the pedal 23R at an extremity end thereof, and fixes a sliding pin 42R (or a sliding roller) on the other end thereof. The sliding pin 42R acts as an oscillating fulcrum point. This sliding pin 42R is engaged in a sliding groove 41R constituting a sliding part 40R and is slid laterally within the sliding groove 41R as a guide.

In this case shown in FIG. 2, the sliding part 40R is formed on an outer surface of the connecting part 4b. Further, the sliding part 40R is positioned over a moving wheel axis (a line L connecting the wheel shafts of the front wheel 1 and the rear wheel 2). In this embodiment, the linear sliding groove 41R constitutes the sliding part 40R. The sliding pin 42R is engaged in the sliding groove 41R with a slight clearance. The sliding part 40R is made of an oil-less metal and so on. Thereby, a sliding friction of the sliding pin 42R can be reduced. A dust-proof case (not shown) is used for preventing dusts, debris and the like from entering into the sliding groove 41R. In addition, in order to reduce a friction with the sliding pin 42R, each of the sliding part 40R and the sliding pin 42R may be plated.

The crank lever 30R is attached to the pedal lever 22R so that the crank lever 30R is positioned near the upper dead center thereof when the pedal 23R is positioned at the uppermost position of motion. At the same time, the pedal lever 22R is engaged with the sliding part 40R in the connecting part 4b through the sliding pin 42R so that the sliding pin 42R is set at a substantial central part (a central point) of the sliding groove 41R.

Accordingly, a right side from the central part of the sliding part 40R is used for sliding the sliding pin 42R when a locus of motion of the pedal 23R shows the first half period (a pedal period) ranging from the uppermost position to the lowermost position. In turn, a left side of the sliding part 40R is used for sliding the sliding pin 42R when a locus of motion of the pedal 23R shows the second half period ranging from the lowermost position to the uppermost position.

In addition, since FIG. 2 shows a configuration in which the gear 28 is arranged at the right side toward a direction in which the bicycle 10 is headed, the rotating force transmitting mechanism 20 such as the pedal lever 22R, the crank lever 30R and the sprocket 26, is shown as being arranged at the right side of the bicycle 10. However, the rotating force transmitting mechanism 20 maybe arranged at the left side toward the direction in which the bicycle 10 is headed.

In the example shown in FIG. 2, to the left side of the bicycle 10 toward the direction in which the bicycle 10 is headed, are arranged the members such as a pedal lever 22L, a crank lever 30L and a sliding part 40L exclusive of the sprocket 26 and the chain 27 from the rotating force transmitting mechanism 20. Each of the detailed configuration and the illustration of these members will be eliminated.

When the rotating force transmitting mechanism 20 is constructed as described above, stepping-on force against the pedal 23R is transmitted to the sprocket 26 through the pedal lever 22R and the crank lever 30R. Since the chain 27 acting as a driving force transmitting means is placed between the sprocket 26 and the rear wheel gear 28, the rotating force of the sprocket 26 is transmitted to the gear 28. Thereby, the rear wheel 2 is driven to generate propulsion force for the bicycle 10.

Figure 4:
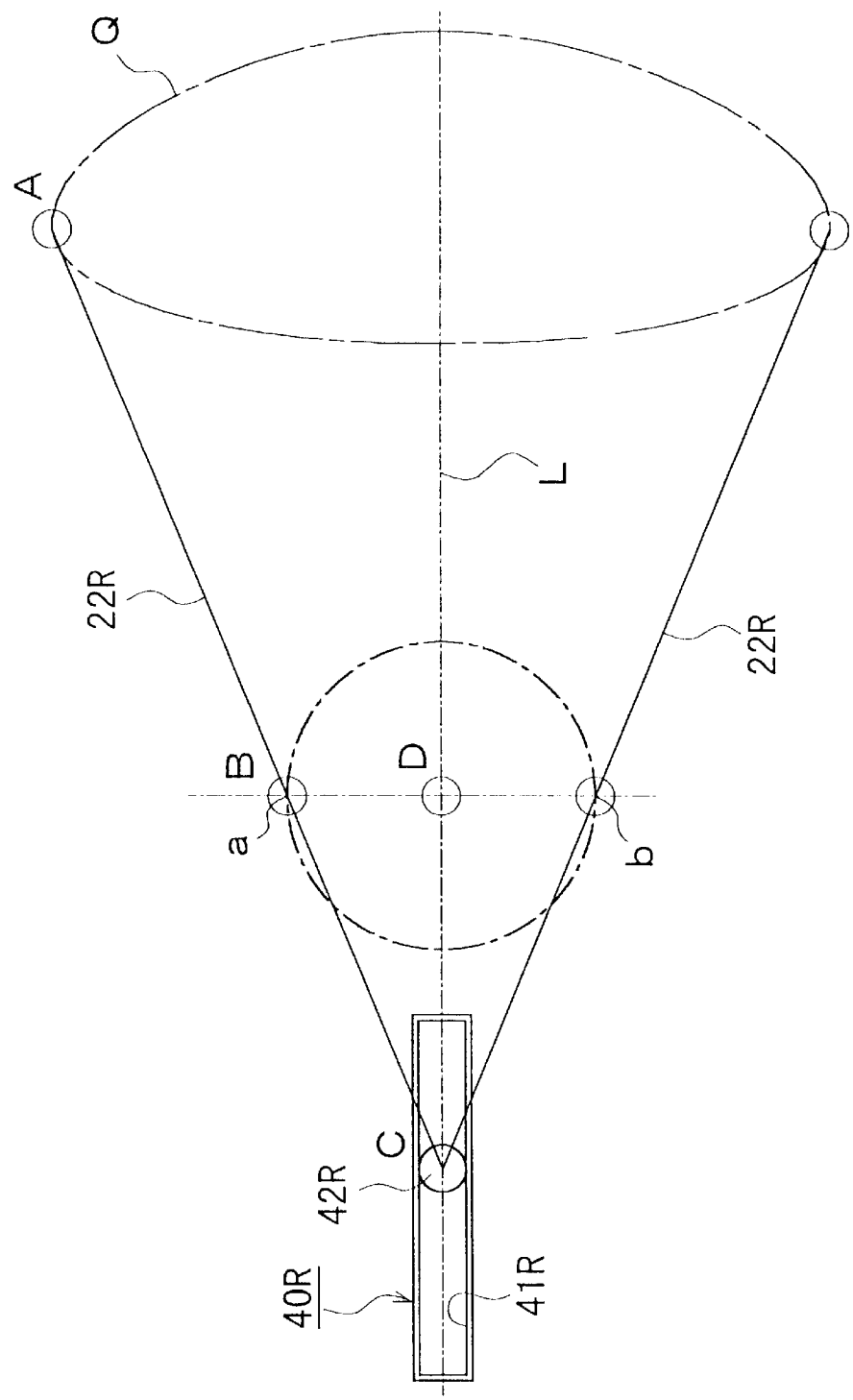
FIG. 4 is a view showing a locus Q of motion of a pedal in the embodiment as shown in FIG. 2.

FIG. 4 shows one example of a locus Q of motion of the pedal 23R when stepping-on force is applied to the pedal 23R and the pedal 23R is reciprocated in one circle. The locus Q of motion of the pedal 23R shows a circular motion or a near linearly reciprocation motion in response to a position of a crossing point between the crank lever 30R and the pedal lever 22R, and the length of the crank lever 30R.

At present, it is assumed that the locus Q of motion is changed like a circular motion→an ellipse motion→a linear motion in response to a ratio of each of the lengths of parts of the pedal lever 22R (AB:BC) when each of the points A, B, C and D is defined as those shown in FIG. 4. Here, A is defined as a position of the pedal 23R; B is defined as the crossing point between the crank lever 30R and the pedal lever 22R; C is defined as a position of an end of the pedal lever 22R, namely, the sliding pin 42R; and D is defined as the fixed position of the crank lever 30R and the shaft 26a of the sprocket 26. It has been found that, in the case of AB:BC=BC:BD=2:1, the pedal 23R shows a locus Q of an approximate linearly reciprocation motion.

FIG. 4 shows an example corresponding to an intermediate case in which a locus Q of motion approximates to the ellipse motion. It has been found that even if the locus Q approximates to an elliptical motion, the pedal 23R moves along the substantial linear locus of motion of the first half period thereof except the upper and lower dead centers and in turn moves along the substantial elliptical locus of motion of the second half period thereof.

A certain study has been performed to check what degree of numerical value is practically attained. When the rider has physical size, for example, a height of about 165 to 170 cm, the moving wheels 1, 2 having the diameters of approximately 20 to 26 inches are used. In this case, it is appropriate that some numerical values (AB=200 to 300 mm, BC=100 to 200 mm, BD=50 to 100 mm) are applied. At this time, it is sufficient that a sliding length of the sliding part 40R is about 100 to 250 mm.

Figure 5:
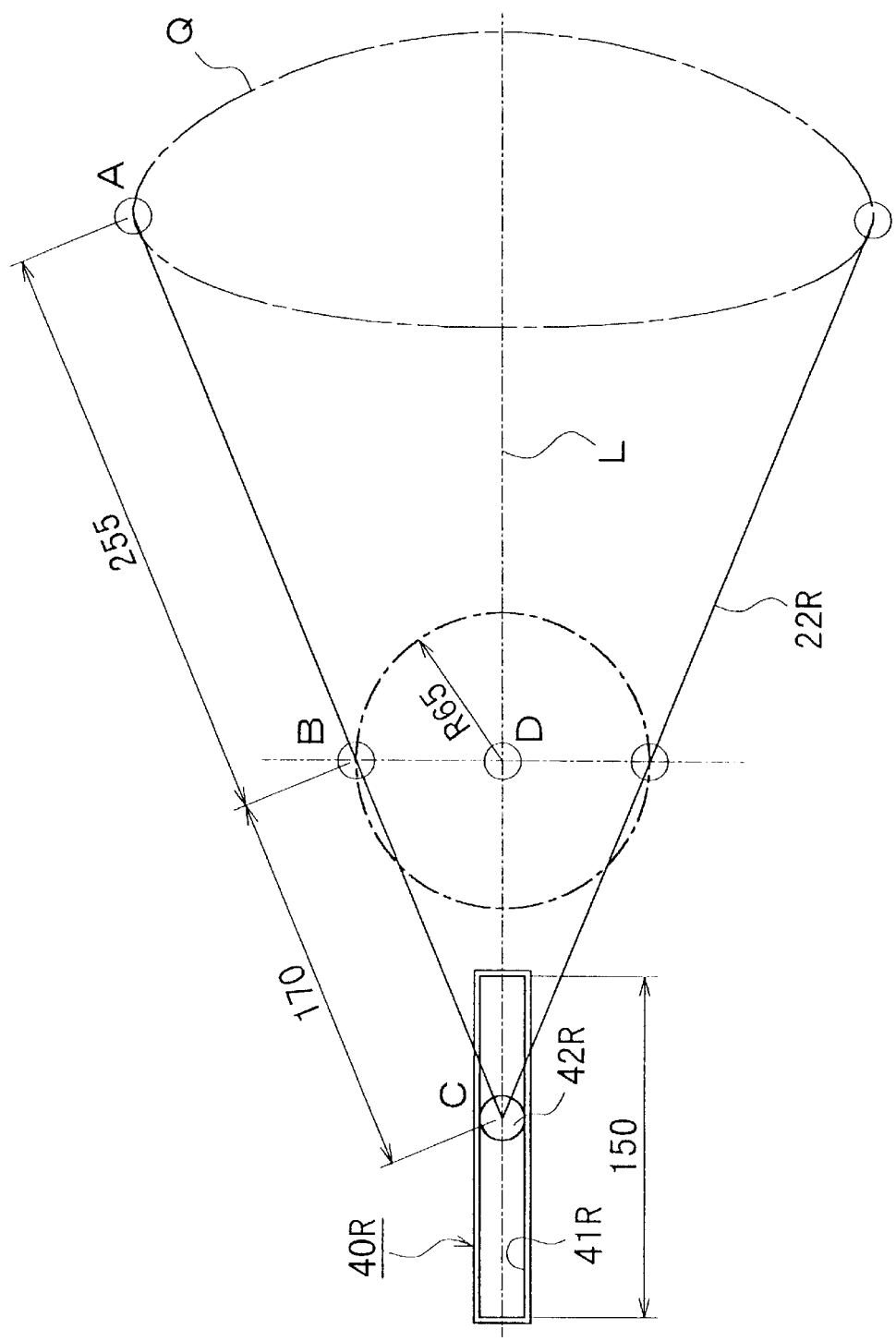
FIG. 5 is a diagram indicating a relation of sizes in a rotating force transmitting mechanism.

An experiment was carried out with values of AB=255 mm, BC=170 mm and BD=65 mm as indicated in FIG. 5. The sliding length at that time was 150 mm. At this time, the locus became an ellipse locus shown in FIG. 4.

As described above, stepping-on force applied to the pedal 23R causes the sprocket 26 to be rotated while the oscillating fulcrum point of the pedal lever 22R is being slid laterally along the moving wheel axis L. Further, this rotating force of the sprocket 26 is transmitted to the rear wheel 2 through the chain 27 and then, the bicycle 10 can be moved forward.

Similar propulsion force may also be attained with the stepping-on force applied to the opposite side pedal 23L (not shown). Although a part of the locus of these pedals 23 (23R, 23L) shows an ellipse one, the ellipse has a long major axis so that the entire locus Q of motion approximates to a linear.

As a result thereof, the pedal 23 may easily be stepped on. In addition, since stepping-on force on the pedal 23 becomes strong, a rotational torque caused by the pedal 23 is increased and the bicycle 10 can be run with effect.

In addition, since the oscillating fulcrum point of the pedal lever 22 (22R, 22L) is a horizontal sliding type, not a fixed point type, a smooth oscillation of the pedal 23 is obtained. Incidentally, when the oscillating fulcrum point of the pedal lever 22 is fixed, it has been found that the pedal 23 can not be moved.

Figure 6:
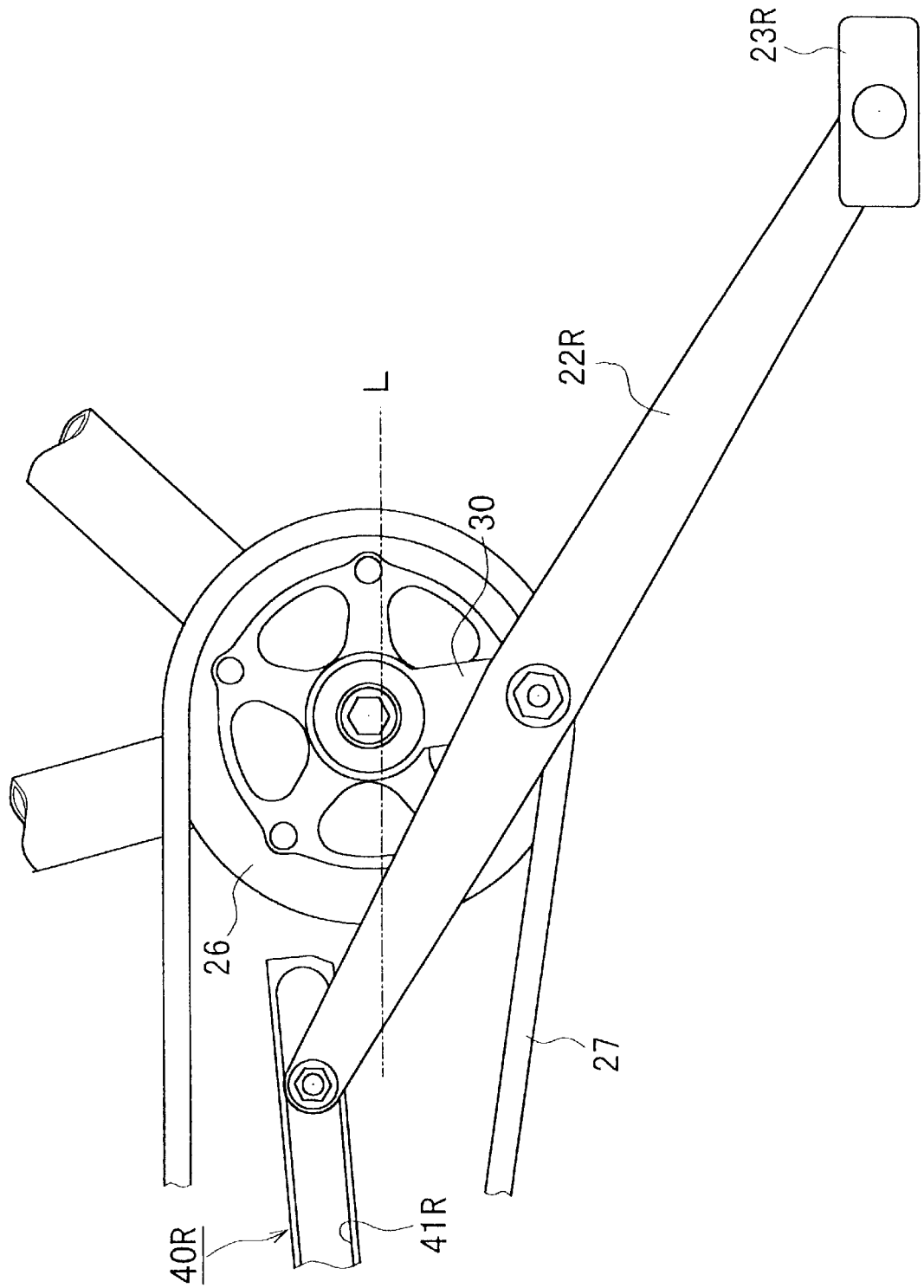
FIG. 6 shows an enlarged view illustrating a substantial part of the rotating force transmitting mechanism according to another preferred embodiment of the invention.

Subsequently, other preferred embodiments of the bicycle 10 in accordance with the present invention will be described. FIG. 6 and its subsequent figures also illustrate only the mechanism of the right side toward a direction in which the bicycle is headed, and a locus Q of motion accompanied with this mechanism.

FIG. 6 shows another preferred embodiment of the invention. Although FIG. 2 shows the preferred embodiment wherein a sliding part 40 (40R, 40L) is arranged on the moving wheel axis L in parallel with this axis, FIG. 6 shows the preferred embodiment wherein it is arranged in an inclined state to the moving wheel axis L, in particular, in an upwardly slant state to a direction in which the bicycle is headed. As the pedal lever 22R in this case, the linear lever is used.

Figure 7:
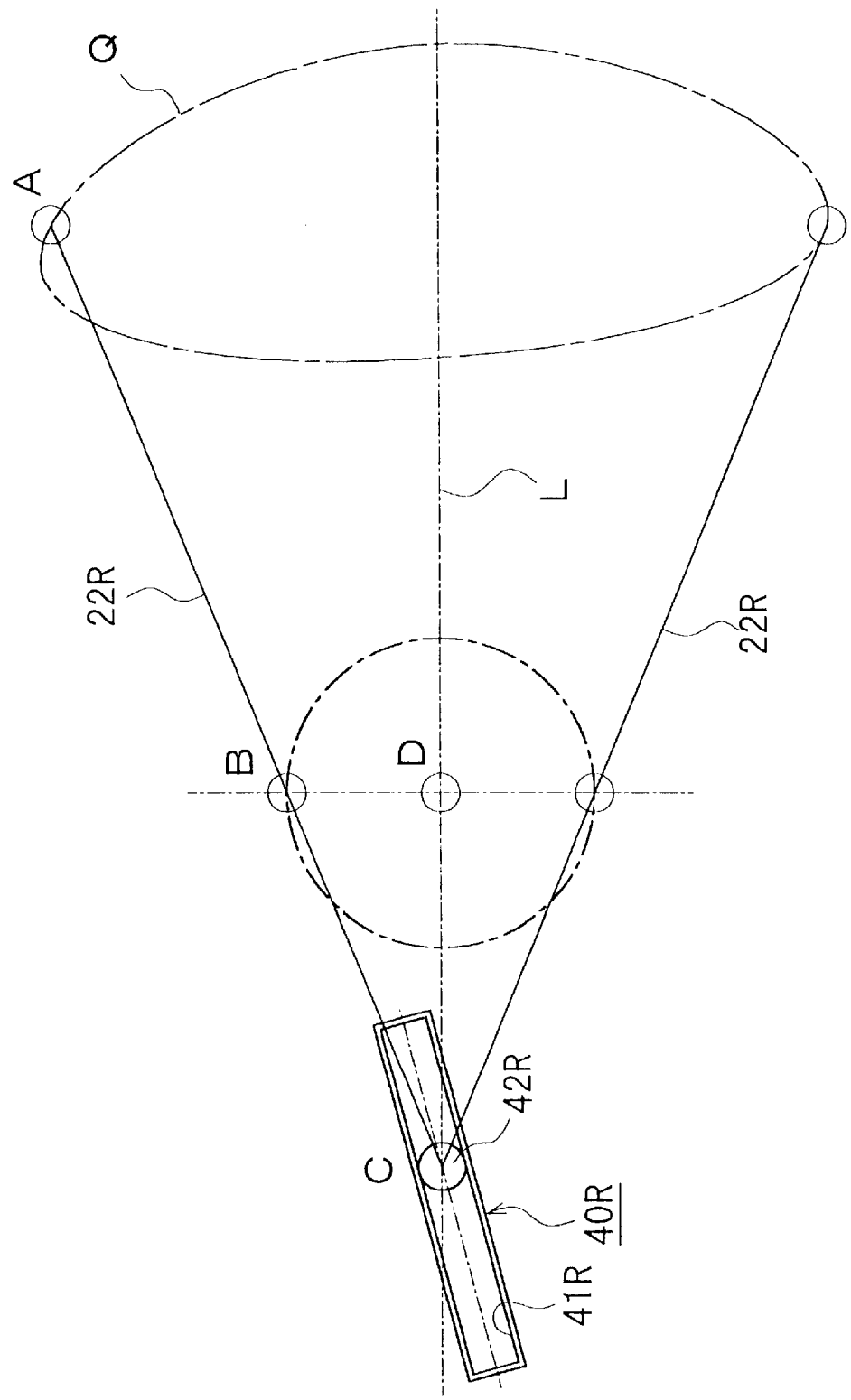
FIG. 7 is a view showing a locus Q of motion of the pedal when a sliding part is inclined in an upward direction.

FIG. 7 illustrates the locus Q of motion of the pedal 23R in this case. The entire locus Q of motion of the pedal 23R in this case is a little inclined as compared with the embodiment shown in FIG. 2.

Figure 8:
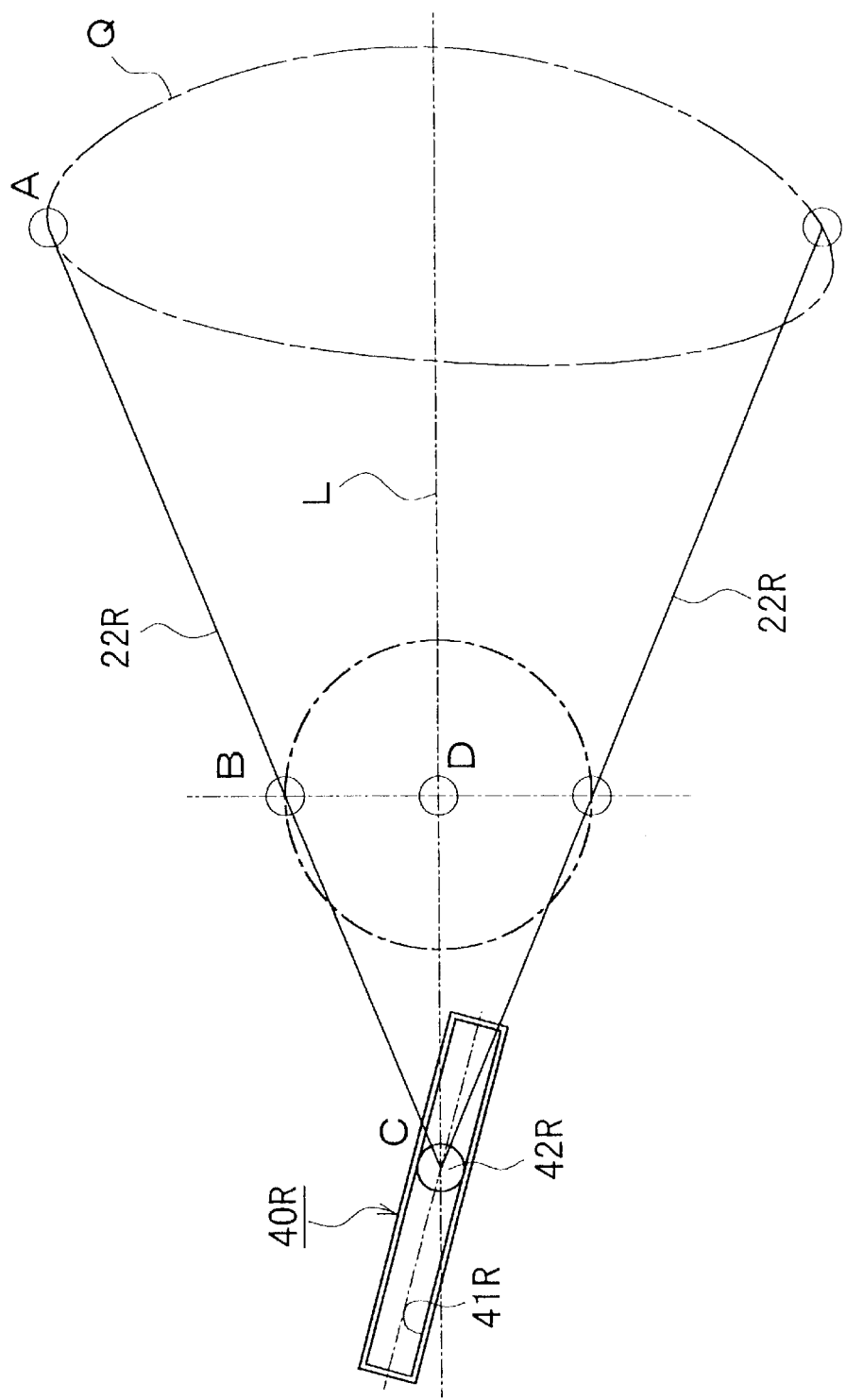
FIG. 8 is a view showing a locus Q of motion of the pedal when a sliding part is inclined in a downward direction.

FIG. 8 illustrates further preferred embodiment wherein the sliding part 40R is arranged in the connecting part 4b in such a way that it may be directed in a slant downward direction. In FIG. 8, a locus Q of motion of the pedal 23R is mainly shown. The entire locus Q of motion of the pedal 23R is a little inclined in a direction opposite to that shown in FIG. 7.

Figure 9:
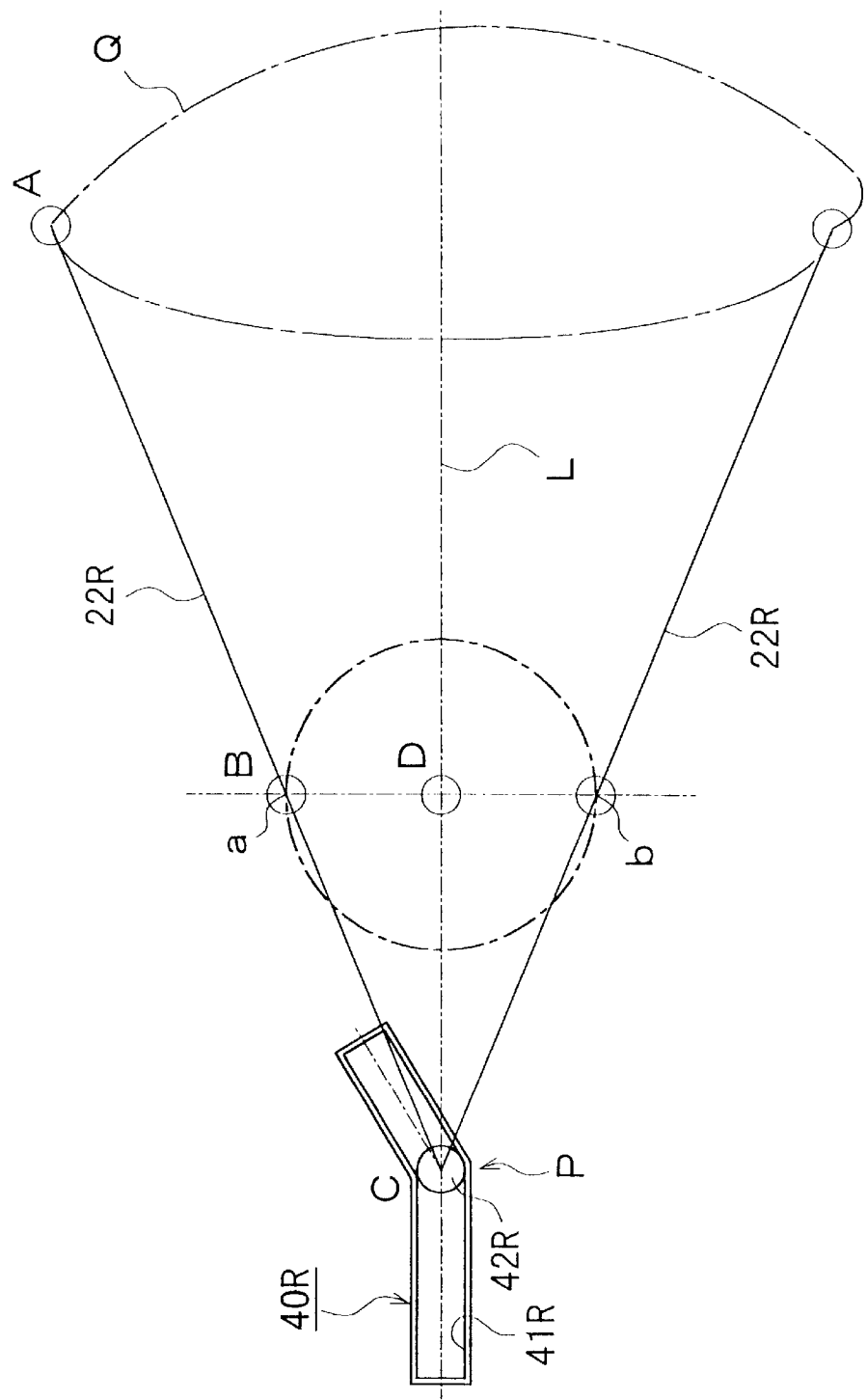
FIG. 9 is a view showing a locus Q of motion of the pedal when a bent sliding part is used.

In each of the aforesaid preferred embodiments, the sliding part 40R has a linear sliding groove 41R. However, FIG. 9 shows the preferred embodiment wherein the sliding groove 41R constituting the sliding part 40R is formed to be a bent-shaped one. That is, the sliding groove 41R shows a bent shape with a bent point P, an end of the sliding groove being bent toward the saddle. This bent point P corresponds to a position of the sliding pin 42R when the pedal lever 22R is substantially positioned at its upper dead center a (or lower dead center b)

Although the locus Q of the motion of the pedal 23R, when the sliding part 40R having such a bent point is used, shows a combination of an ellipse motion and a linear motion, it is found that a slight disturbance may occur in the locus Q of motion of the pedal 23R at either the upper dead center a or the lower dead center b of the crank lever 30R. Others are similar to those of the aforesaid preferred embodiments, so that their description will be eliminated.

Figure 10:
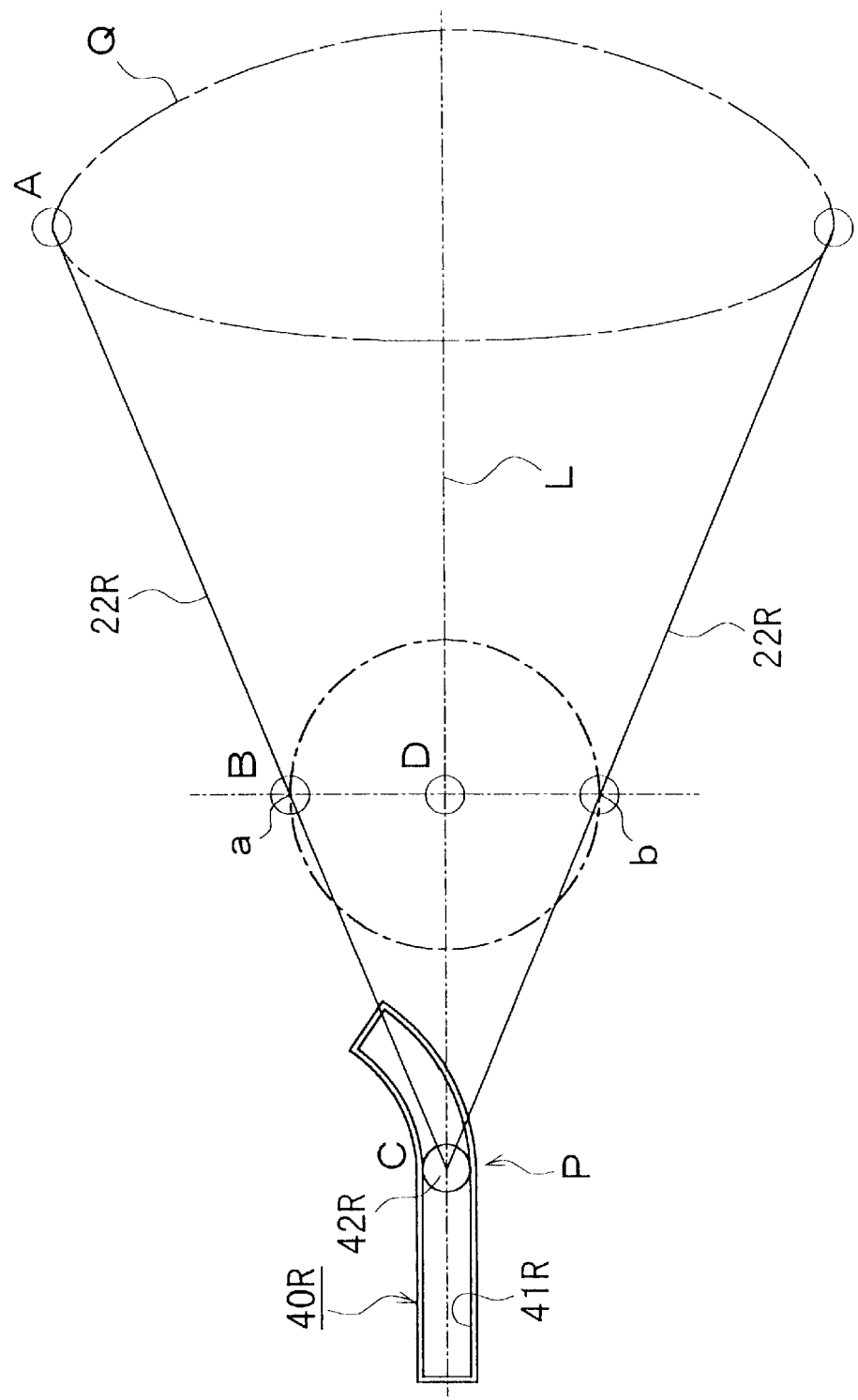
FIG. 10 is a view showing a locus Q of motion of the pedal when a curved sliding part is used.

In place of the sliding part 40R having a bent shape, it is also possible to use the sliding part 40R having a curved shape as shown in FIG. 10. In the case of this preferred embodiment, less slight disturbance of the locus Q of motion near either the upper dead center a or the lower dead center b is found in correspondence to non-presence of a clear bent point P.

Both directions of the bent portion and the curve portion may be opposite to those shown in FIG. 9 and FIG. 10.

Figure 3:
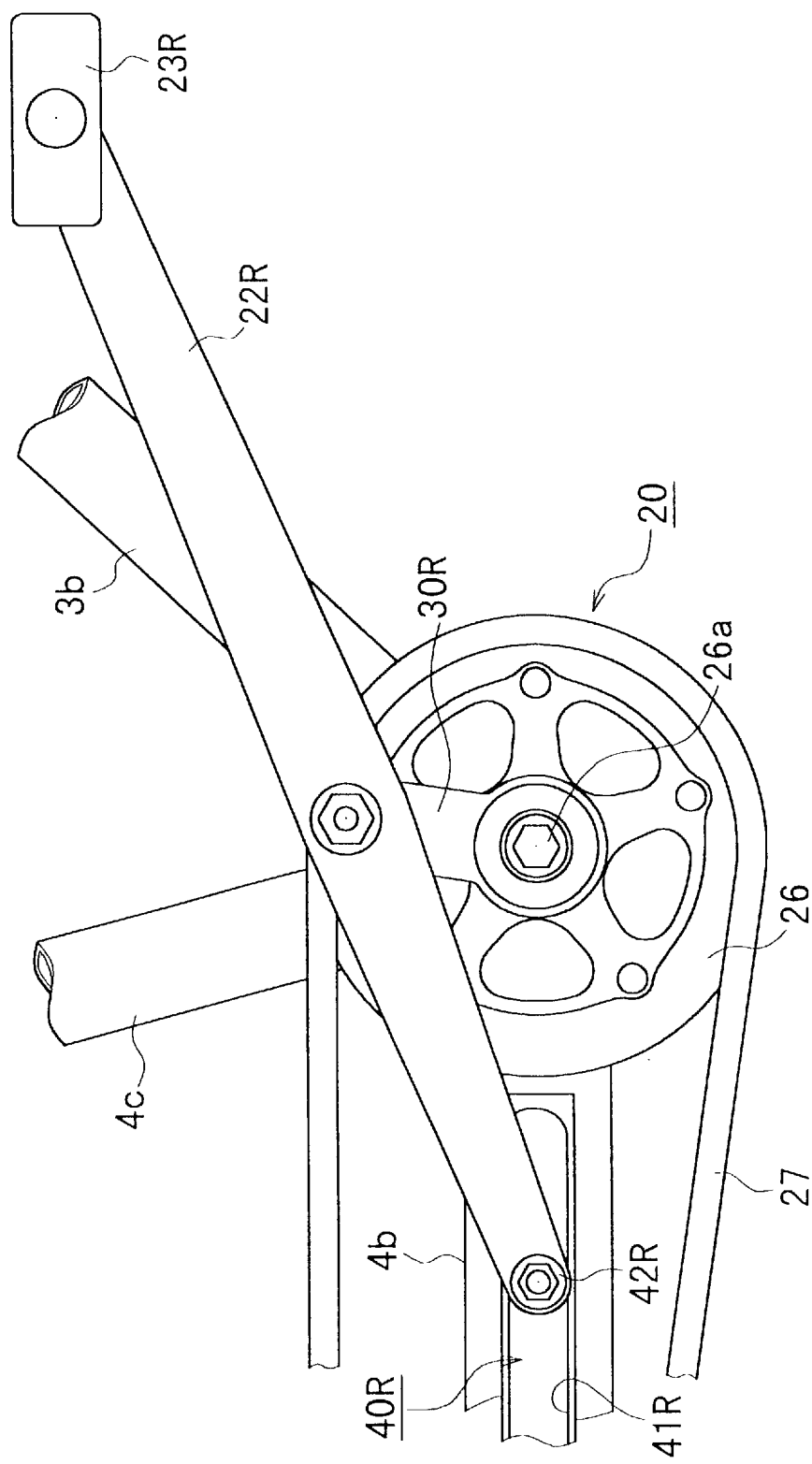
FIG. 3 shows a partial enlarged side elevational view illustrating a configuration of the rotating force transmitting mechanism with an oscillating fulcrum point.
Figure 11:
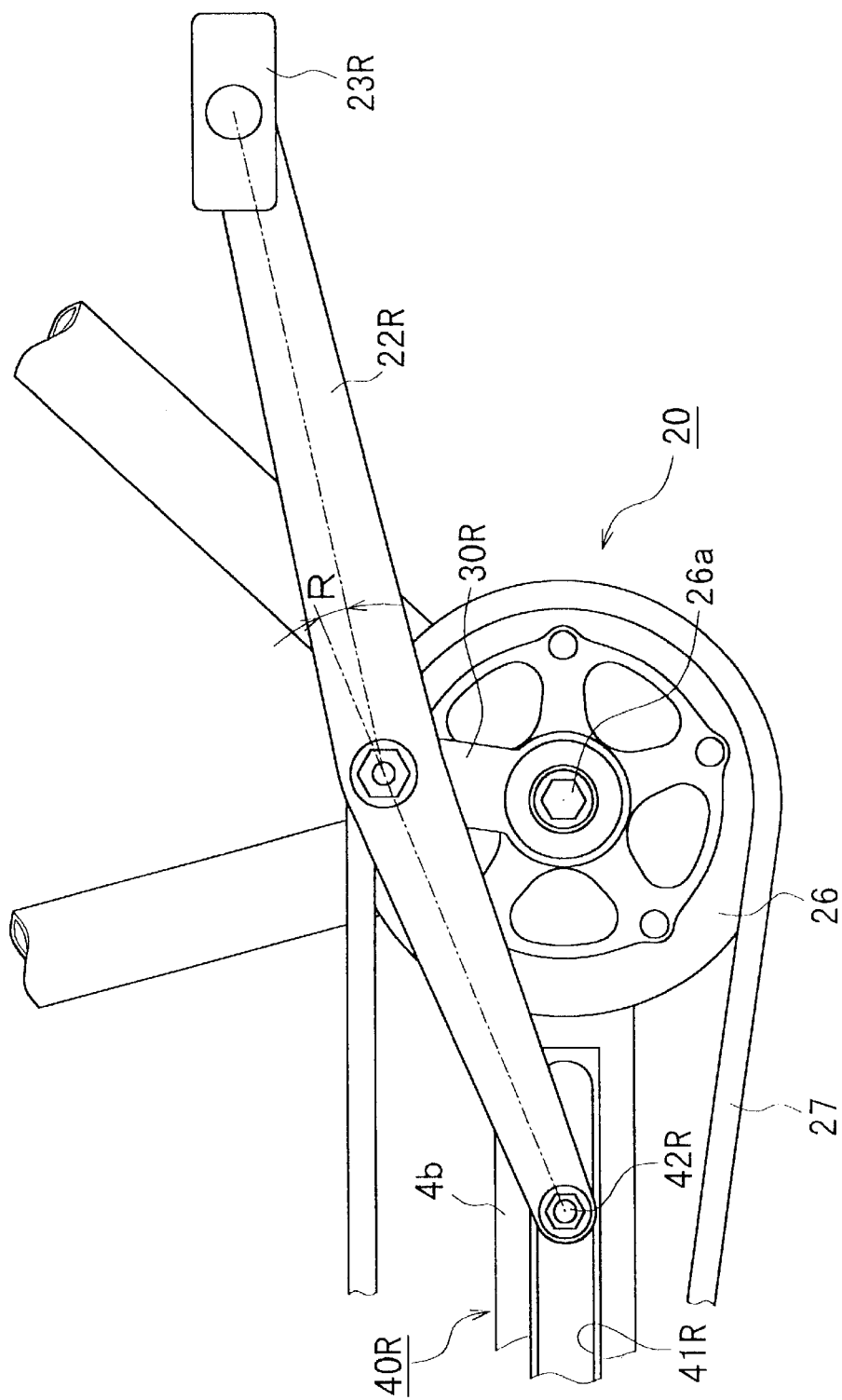
FIG. 11 shows an enlarged view illustrating a substantial part of the rotating force transmitting mechanism according to further preferred embodiment of the invention wherein bent pedal lever is used.

Although a linear lever is used as the pedal lever 22R in the preferred embodiments described above, a bent lever may also be used. FIG. 11 shows a further preferred embodiment corresponding to that shown in FIG. 3, so that in this preferred embodiment, the pedal lever 22R has a gradually bent shape with the bent portion being protruded upwardly.

Figure 12:
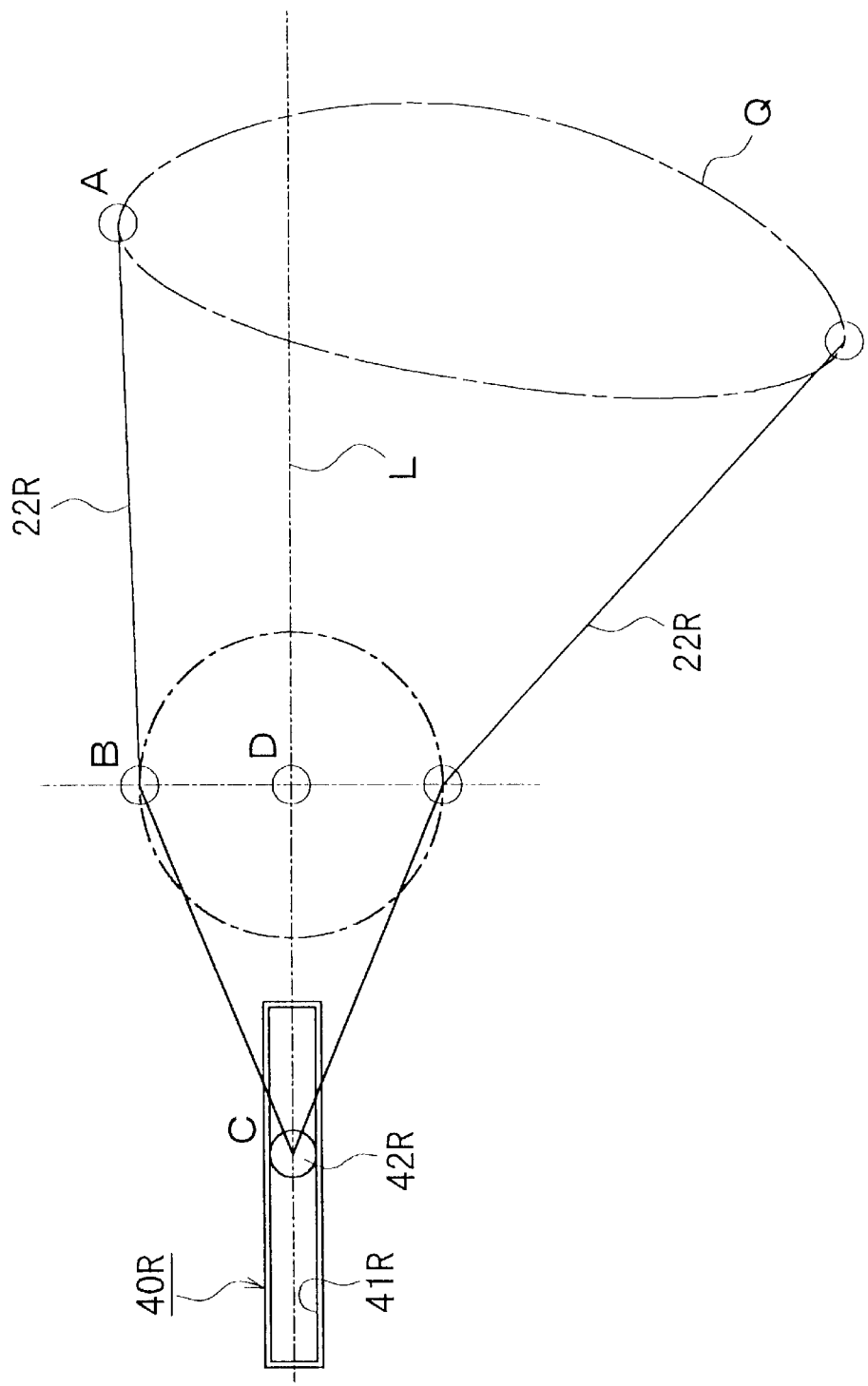
FIG. 12 is a view indicating a locus Q of motion of the pedal in the embodiment as shown in FIG. 11.

FIG. 12 illustrates a locus Q of motion of the pedal 23R in this case. In the case that such a pedal lever 22R having a bent-shape is used, the locus Q of motion of the pedal 23R is shifted in a slant downward direction, so that the pedal 23R can be more easily stepped on as compared with that shown in FIG. 4.

Figure 13:
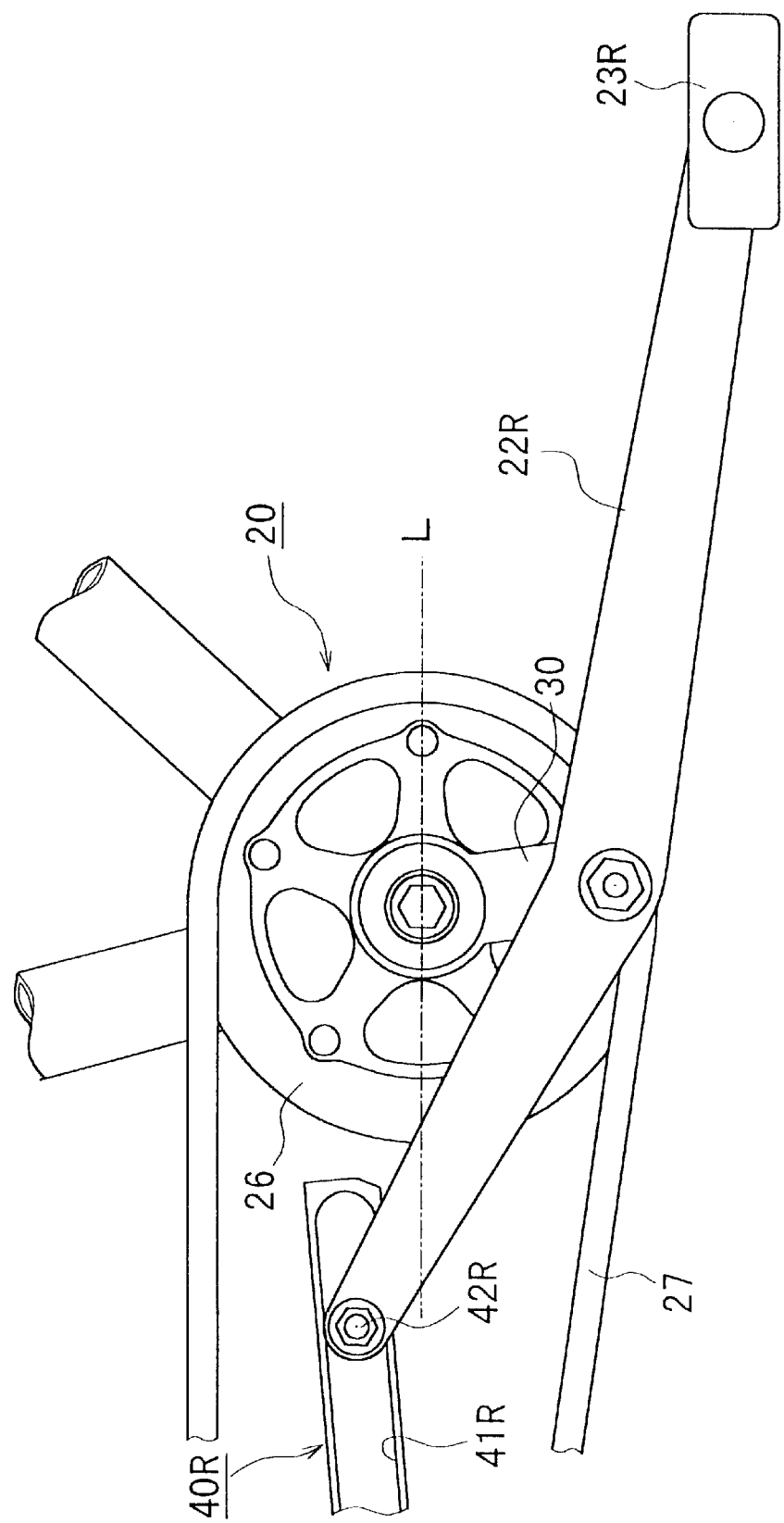
FIG. 13 shows an enlarged view illustrating a substantial part of the rotating force transmitting mechanism according to still further preferred embodiment of the invention wherein the bent type pedal lever and the sliding part are used.
Figure 14:
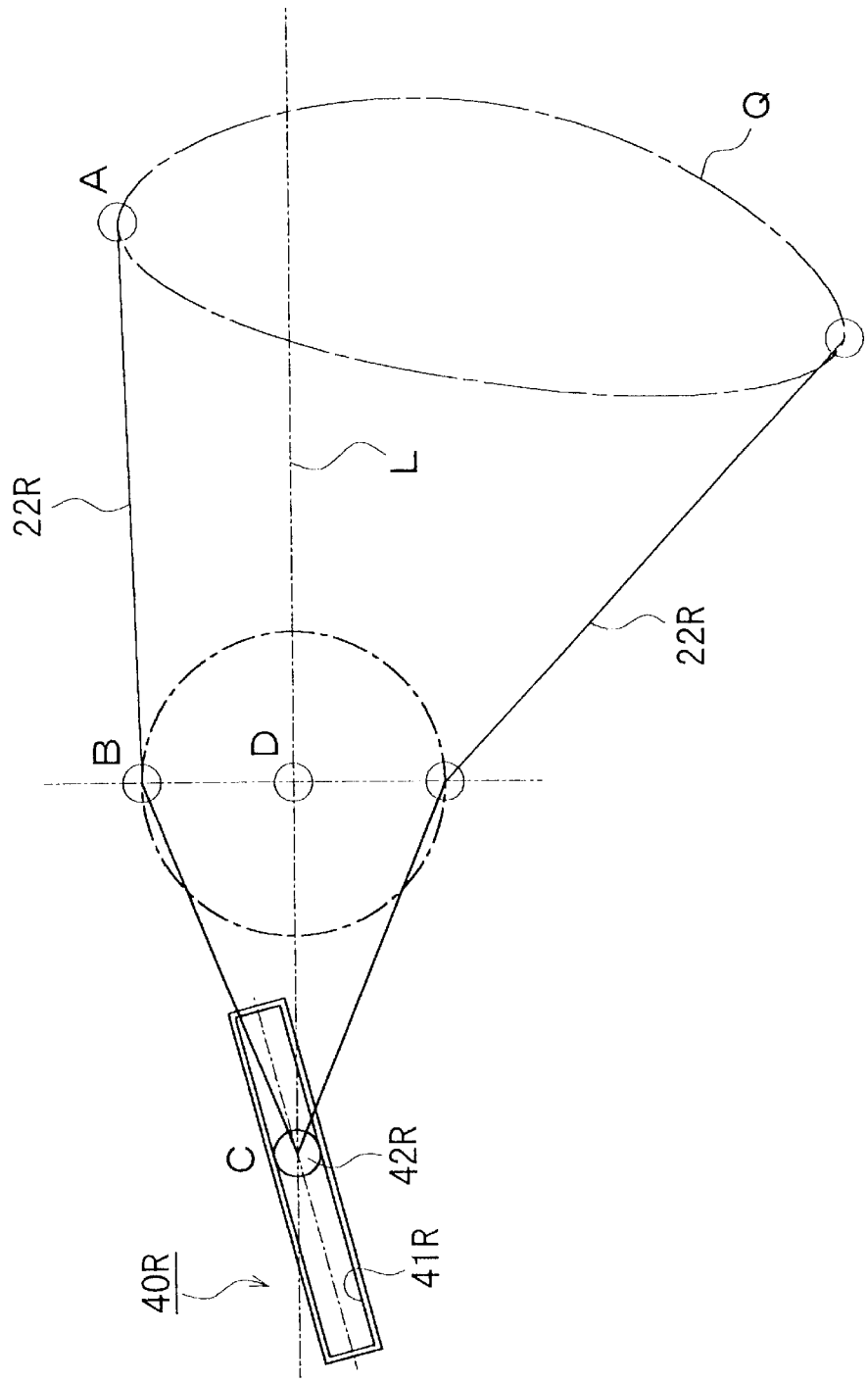
FIG. 14 is a view indicating a locus Q of motion of the pedal in the embodiment as shown in FIG. 13.

FIG. 13 shows still further preferred embodiment. In this embodiment, a pedal lever 22R having a gradually bent shape with the bent portion being protruded downwardly, is used. However, it is preferable that in this case, the sliding part 40R is arranged to face in a slant upward direction. As apparent from FIG. 14, this is because, although the locus Q of motion of the pedal 23R is shifted to a lower location than the moving wheel axis L, the locus Q of motion shows in a substantially vertical reciprocation direction. When the sliding part 40R is positioned in a horizontal state, the locus Q of motion of the pedal 23 may face in a slant downward direction, resulting in that the pedal 23R is hardly stepped on.

Figure 15:
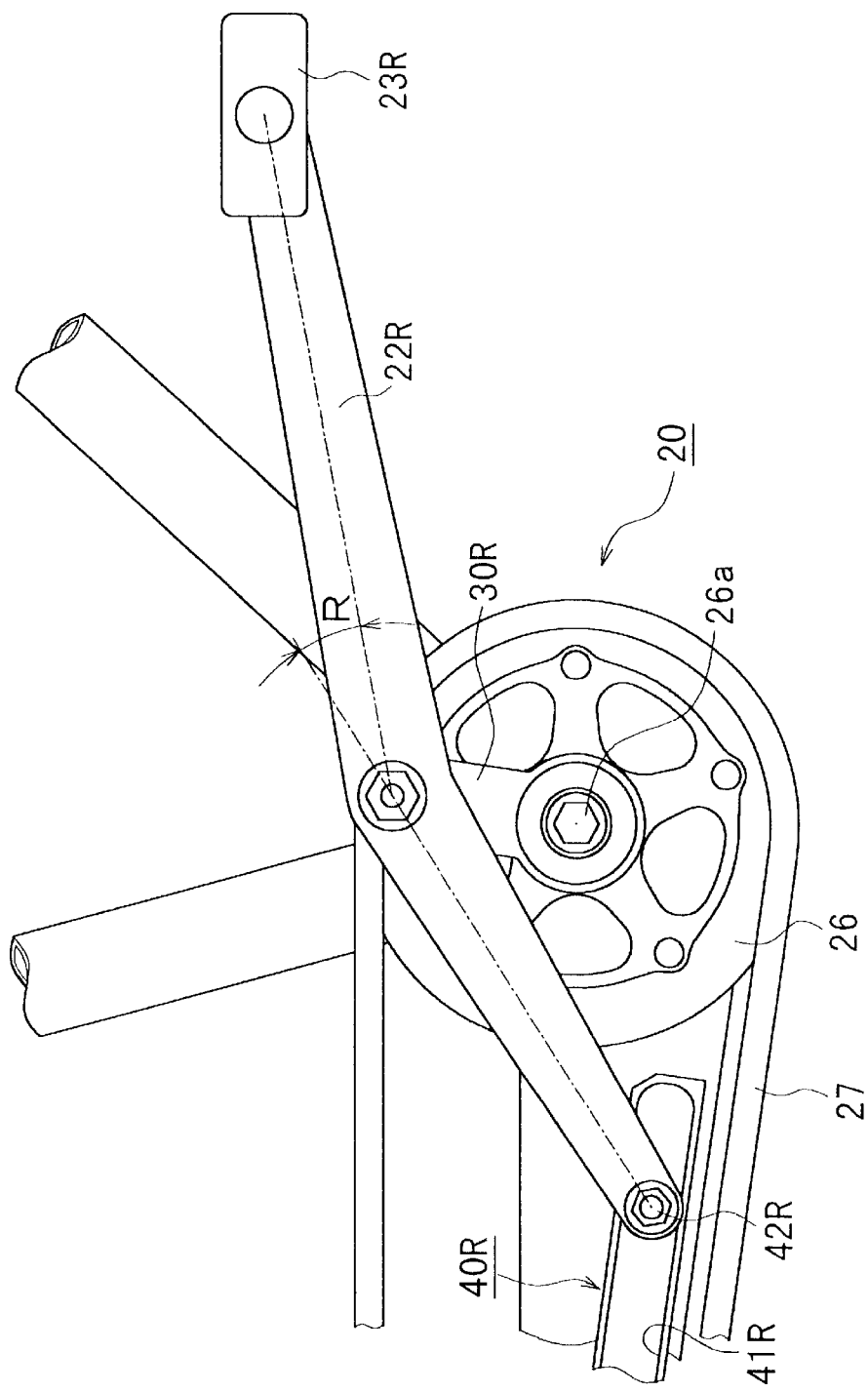
FIG. 15 shows an enlarged view illustrating a substantial part of the rotating force transmitting mechanism according to another preferred embodiment of the invention wherein the pedal lever having a large bent angle and the sliding part are used.
Figure 16:
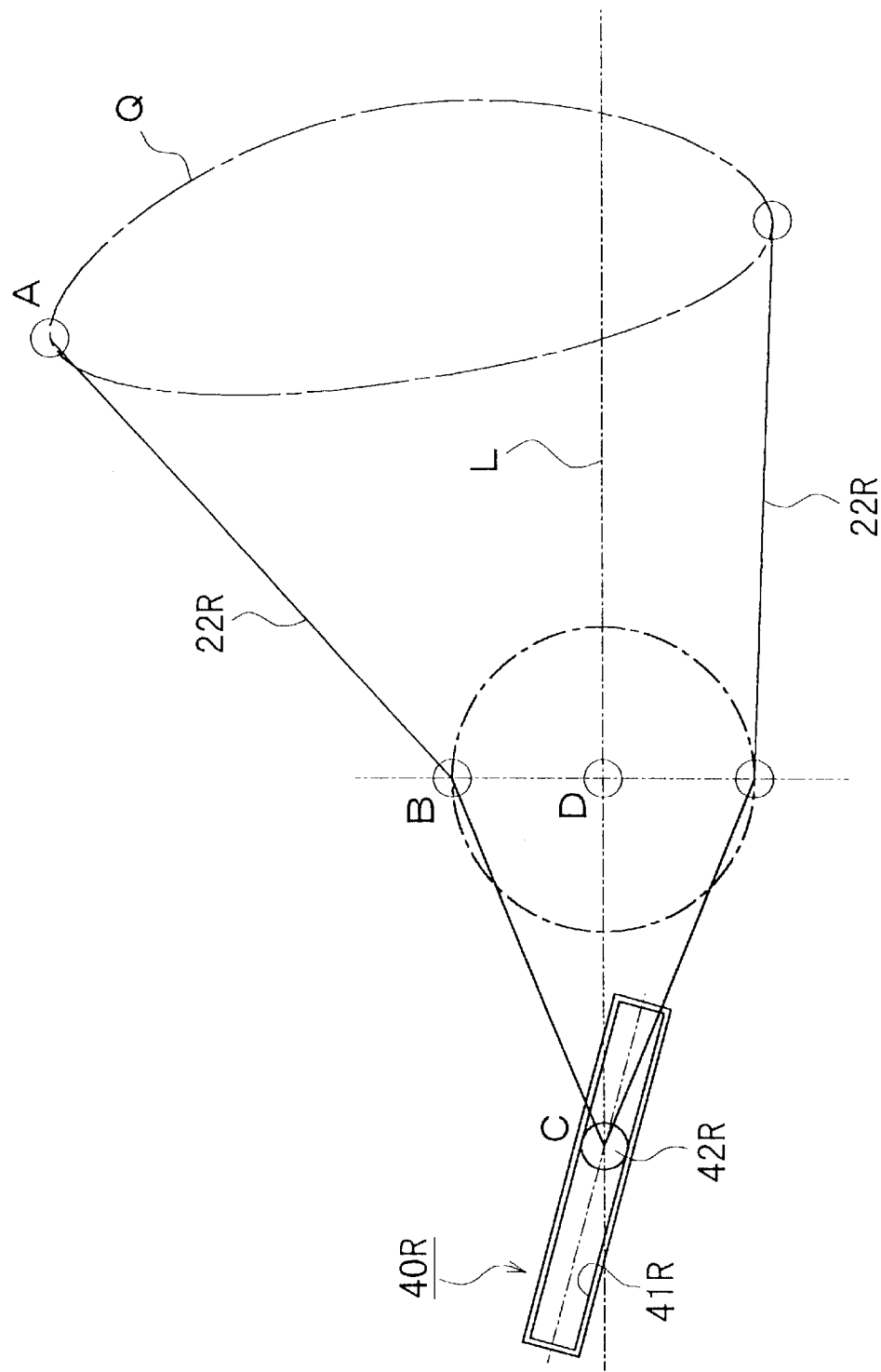
FIG. 16 is a view indicating a locus Q of motion of the pedal in the embodiment as shown in FIG. 15.

In the case that the pedal lever 22R having a large bending angle R as shown in FIG. 15, is used, the linear sliding part 40R is arranged to face in a slant downward direction. In such a case, as apparent from FIG. 16, the locus Q of motion of the pedal 23R is shifted slightly above the moving wheel axis L, but its locus Q shows in a substantially vertical reciprocation direction.

Figure 17:
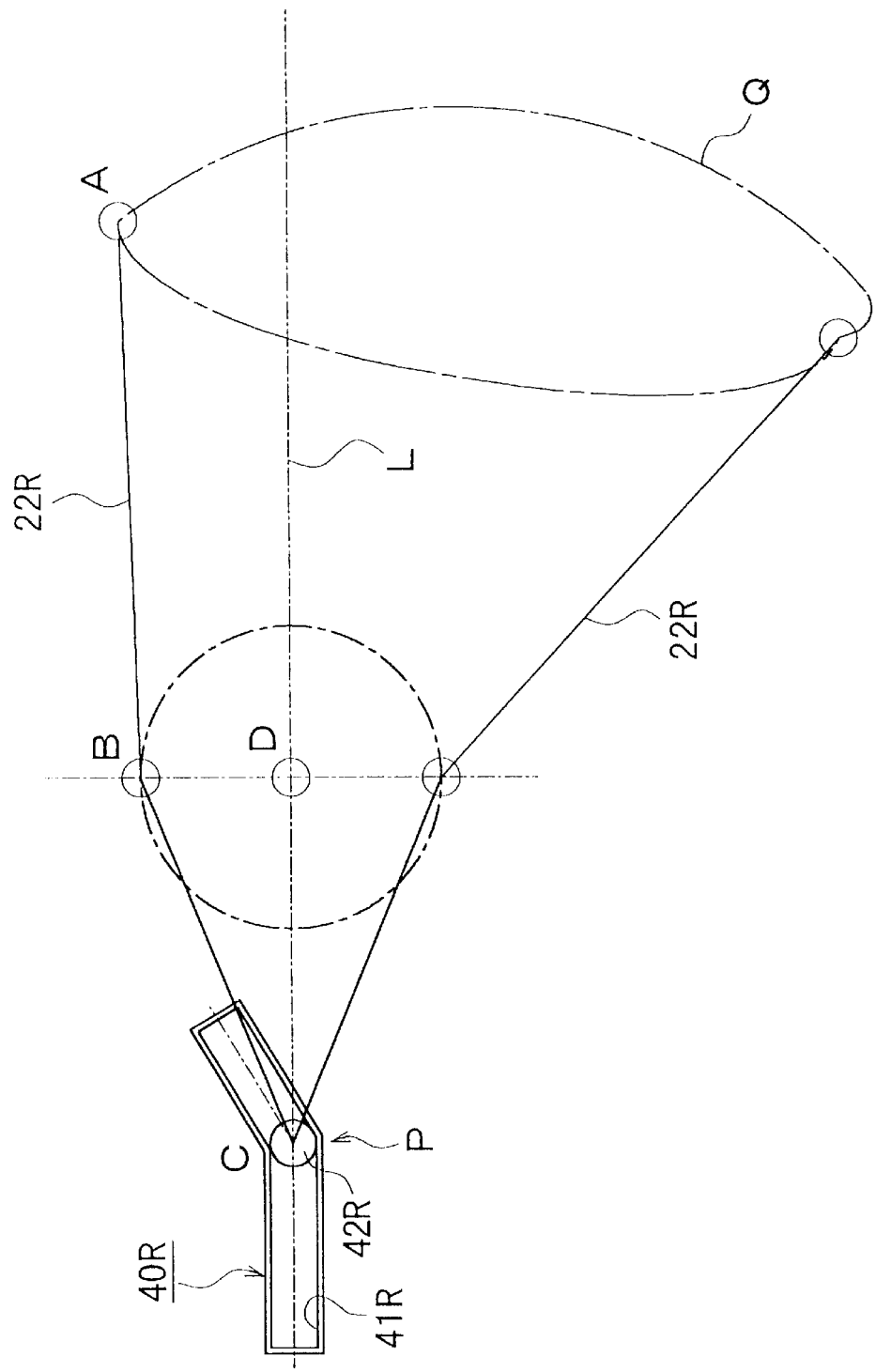
FIG. 17 is a view indicating a locus Q of motion of the pedal when the bent type pedal lever and the bent type sliding part are used.

A preferred embodiment shown in FIG. 17 applies to a combination of the bent-type pedal lever 22R and the bent-type sliding part 40R. The locus Q of motion of the pedal 23R at this time may become relatively large and further it is shifted slightly to a downward position below the moving wheel axis L.

Figure 18:
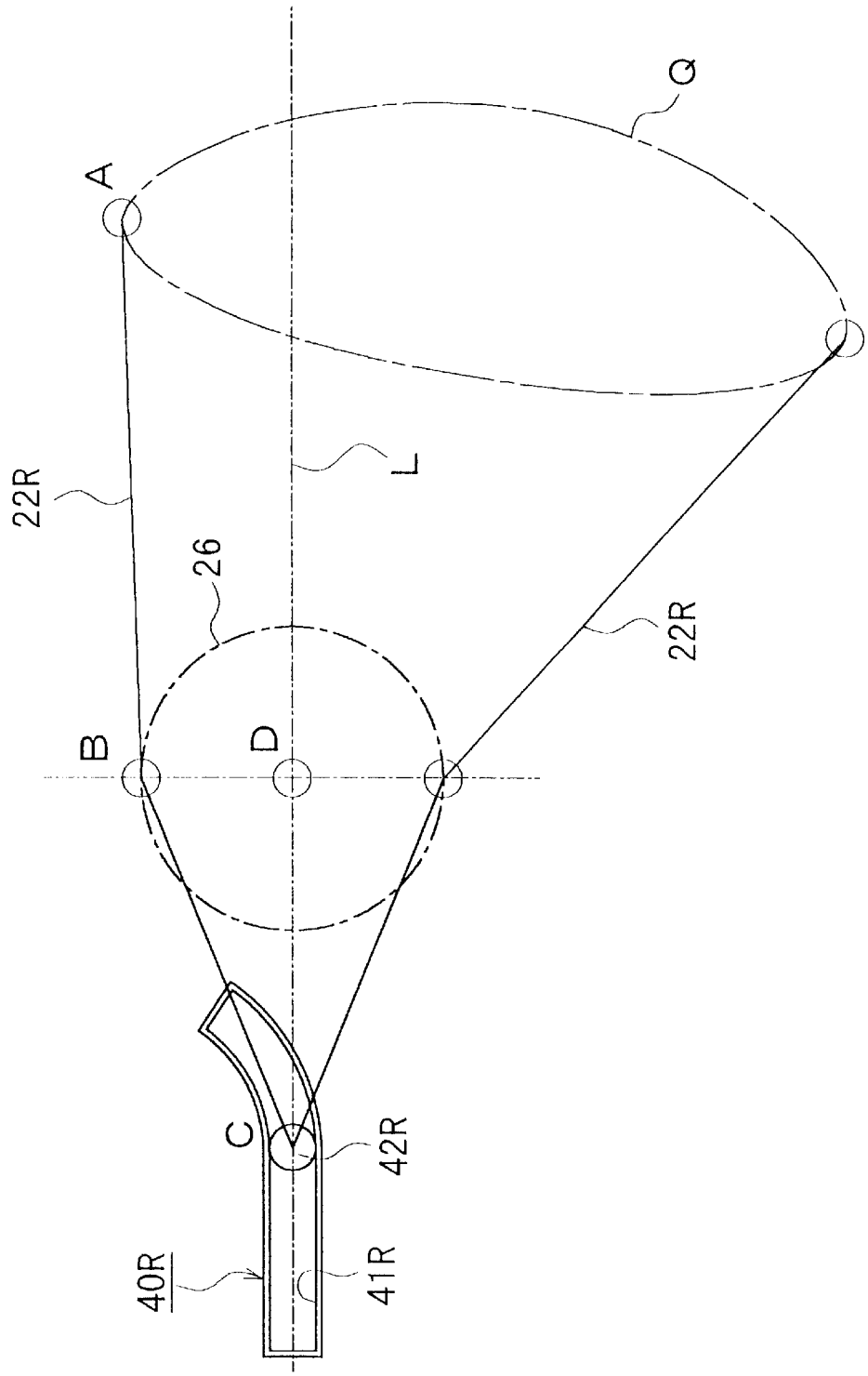
FIG. 18 is a view indicating a locus Q of motion of the pedal when the bent type pedal lever and the curved type sliding part are used.

FIG. 18 shows a modification of the preferred embodiment shown in FIG. 17. FIG. 18 shows only the locus Q of motion. In this case, the curved-type sliding part 40R acting as the sliding part 40R is used, whereby the locus Q of motion of the pedal 23R becomes more smooth than that shown in FIG. 17.

Figure 19:
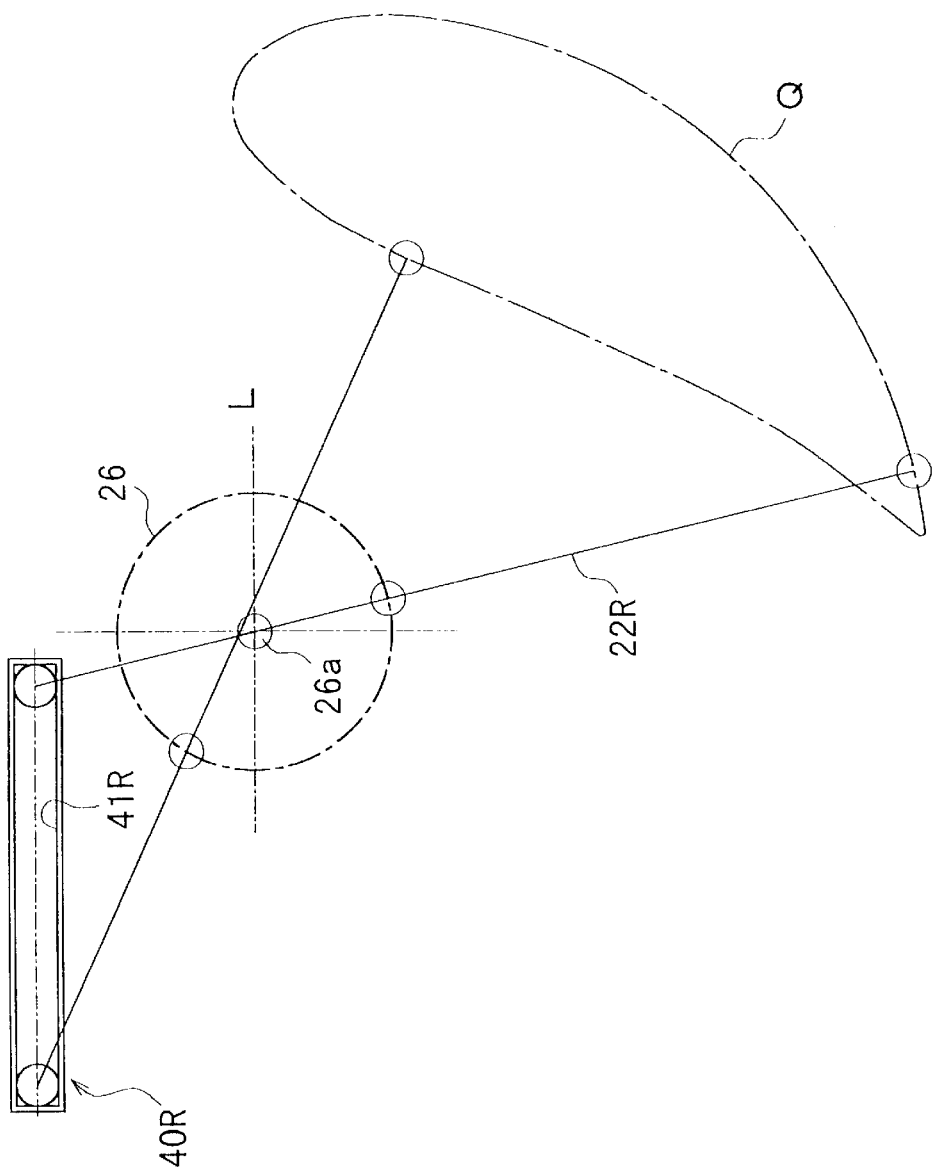
FIG. 19 is a view indicating a locus Q of motion of the pedal when the arranging position of the sliding part is changed.

FIG. 19 illustrates a preferred embodiment in which the sliding part 40R is shifted widely toward the saddle. In this case, the rotating shaft 26a of the sprocket 26 is positioned at a location below the bottom bracket point. As the linear sliding part 40R constitutes the sliding part 40R at this time, the locus Q of motion of the pedal 23R shows a shape of teardrop as shown in FIG. 19.

Figure 20:
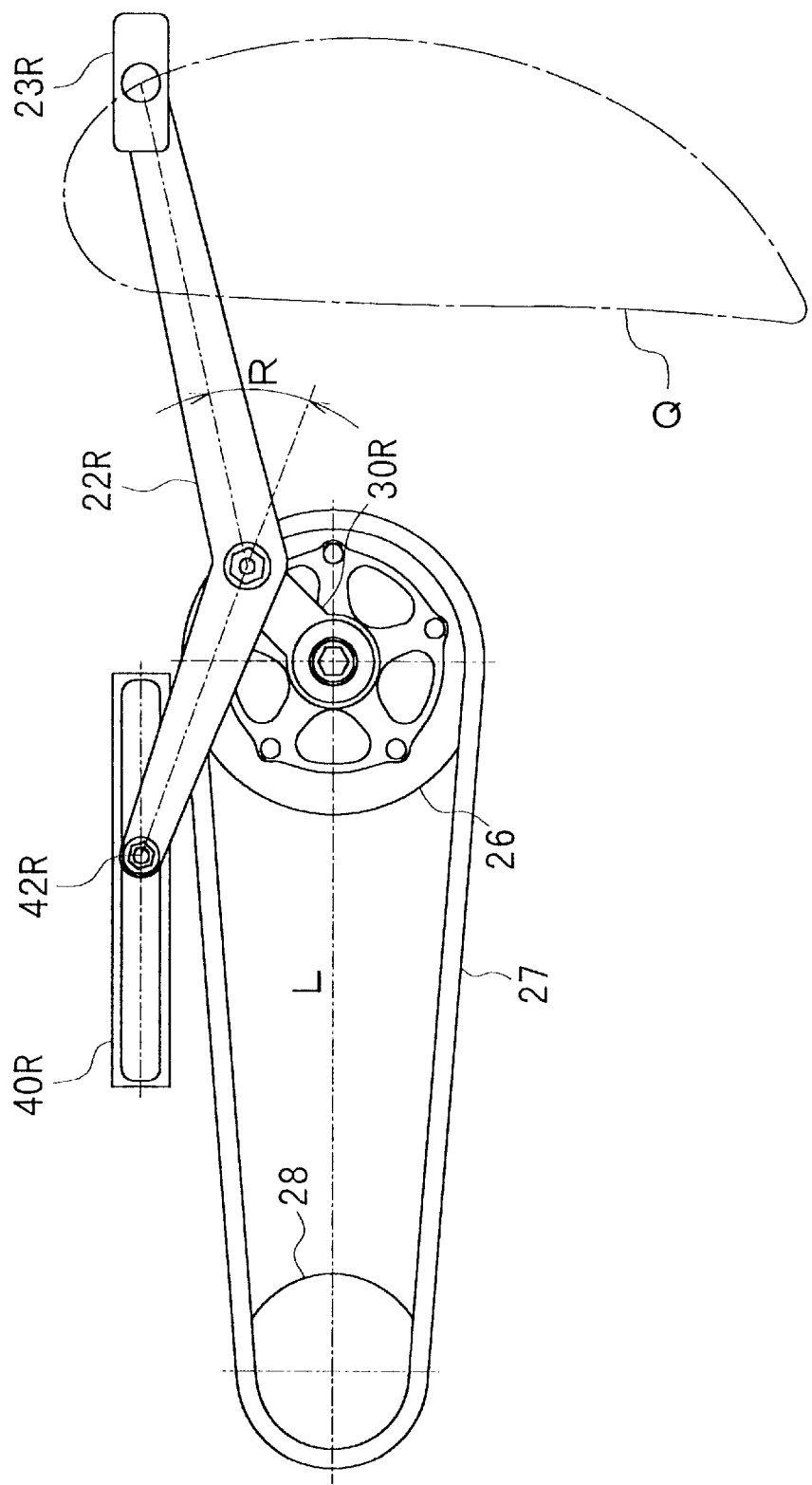
FIG. 20 is a configuration view showing a substantial part of the rotating force transmitting mechanism to indicate the practical example to which the embodiment as shown in FIG. 20 is applied.
Figure 21:
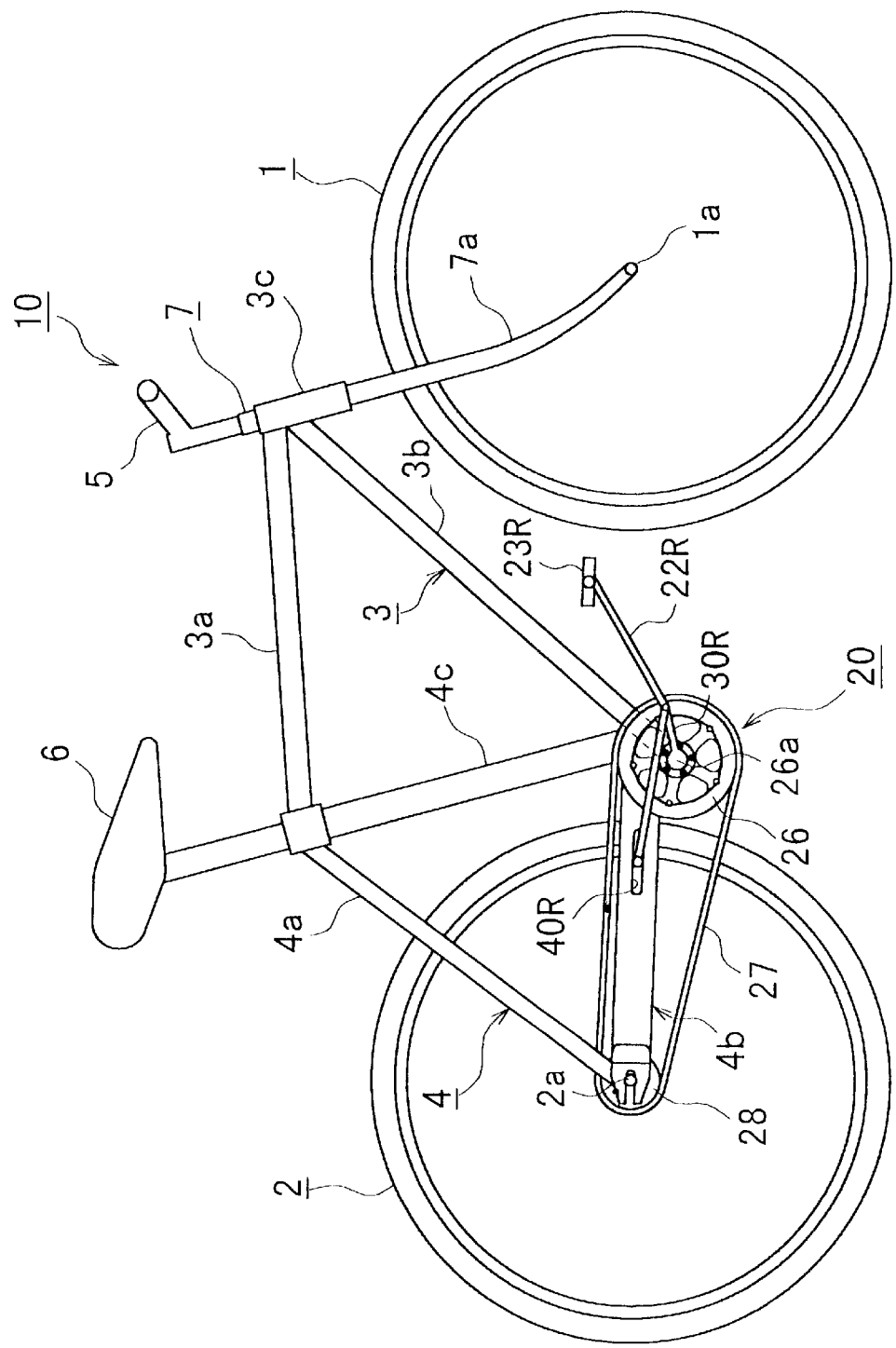
FIG. 21 illustrates a configuration of a bicycle as a preferred embodiment of the invention.

In order to use such a locus Q of motion effectively I the invention, it is sufficient that a combination of the upwardly shifted sliding part 40R and the pedal lever 22R having a bent shape with the bent portion being protruded downwardly, as shown in FIG. 20, the bent angle R of which is acute, is used. Actually, the sliding part 4OR is arranged in the connecting part 4b as shown in FIG. 21 in such a way that it may be in parallel with the moving wheel axis L, and the sprocket 26 is fixed at a location below the bottom bracket (lower than the moving wheel axis L) and near the rear wheel 2. With such an arrangement, there occurs a less possibility that a cuff of a trouser or a hem of a skirt is caught in the chain 27.

Figure 22:
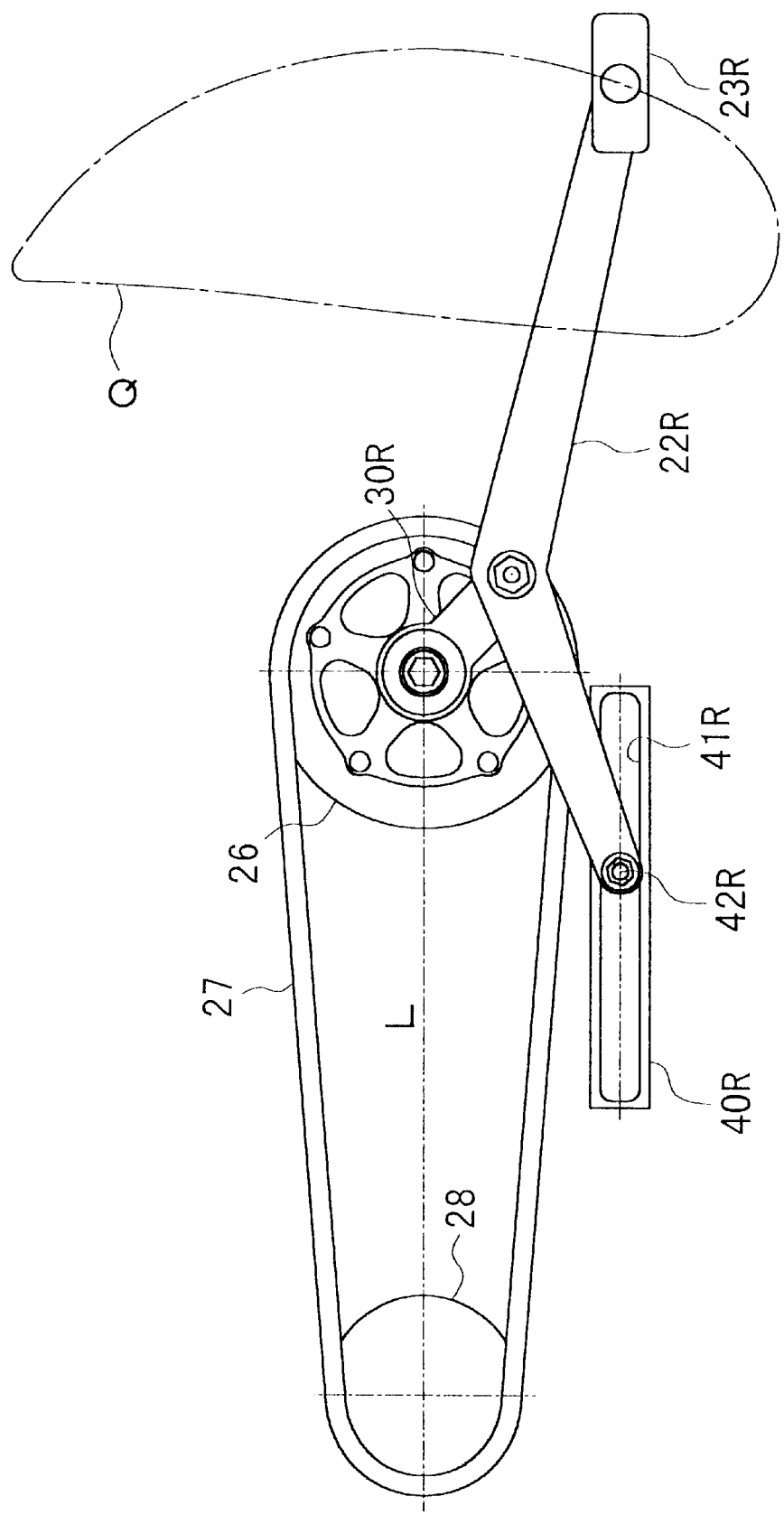
FIG. 22 is a view showing a locus Q of motion of the pedal when an arranging position of the sliding part is changed to a lower side.
Figure 23:
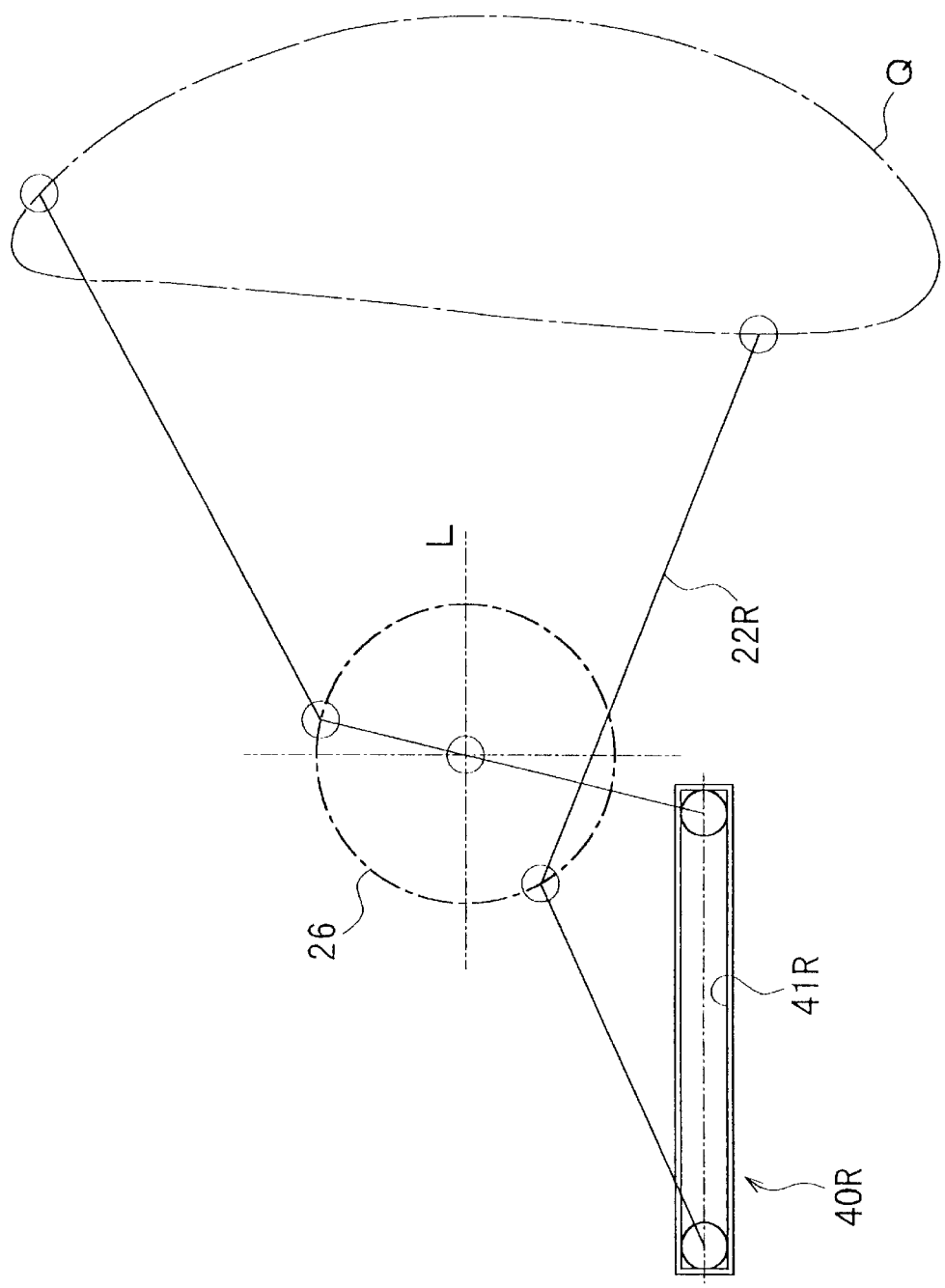
FIG. 23 is a view indicating a locus Q of motion of the pedal in the embodiment as shown in FIG. 22.

FIG. 22 shows another preferred embodiment of the present invention wherein the sliding part 40R is arranged at a position below the moving wheel axis L, which is quite the reverse of the embodiment shown in FIG. 20. FIG. 23 shows the locus Q of motion of the pedal 23R in this case. Also in this preferred embodiment, the locus Q of motion shows a relative superior linear characteristic.

Figure 24:
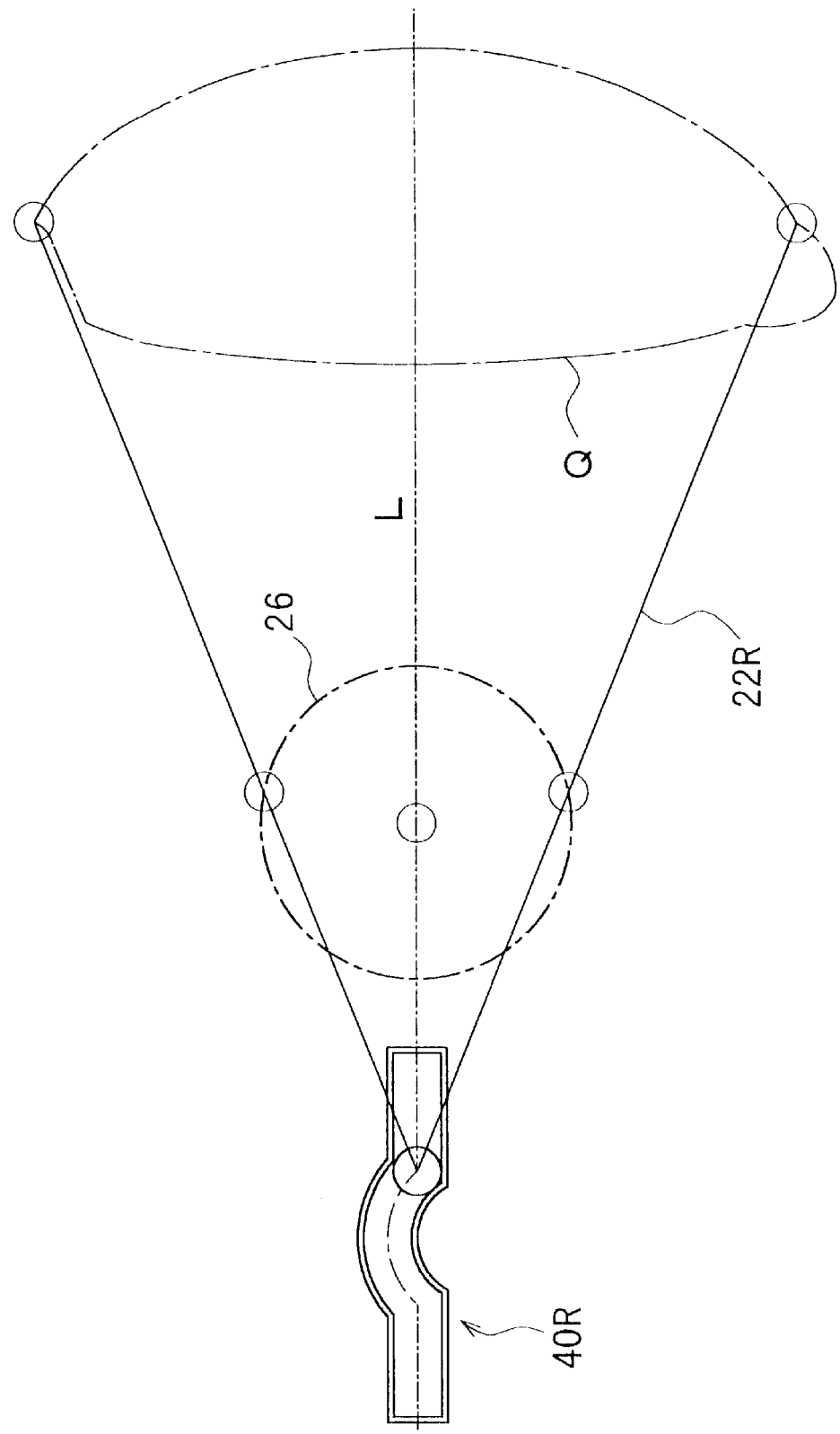
FIG. 24 is a view indicating a locus Q of motion of the pedal according to still another preferred embodiment of the invention wherein the sliding part having a shape with a curved portion at its central part, is used.

FIG. 24 and its subsequent figures illustrate still other preferred embodiments of the sliding part 40R. FIG. 24 illustrates further preferred embodiment in which the sliding part 40R has a shape with a curved portion at its central part. At this time, FIG. 24 shows the slightly deformed locus Q of motion of the pedal 23R.

Figure 25:
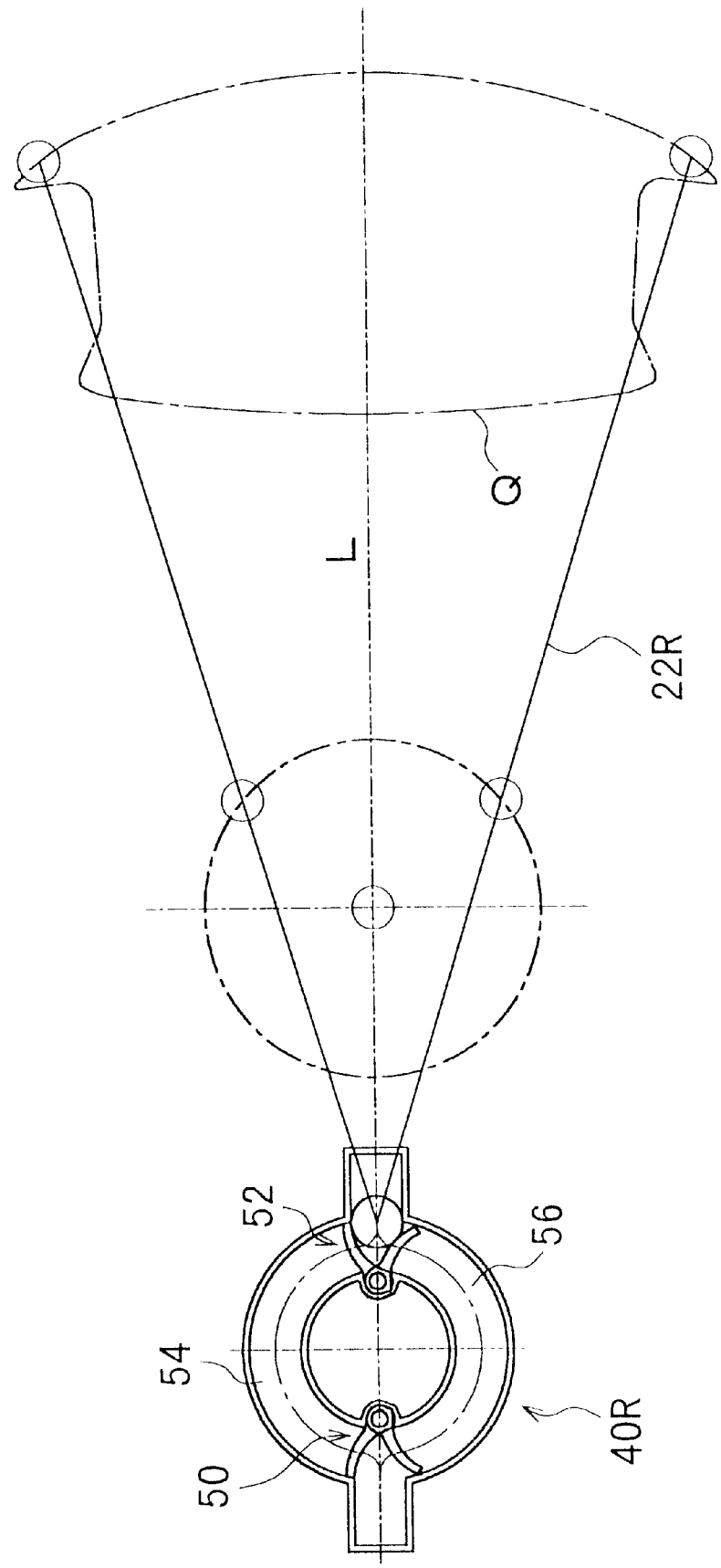
FIG. 25 is a view indicating a locus Q of motion of the pedal according to further preferred embodiment of the invention wherein the sliding part is constructed as an annular-shaped one.
Figure 26:
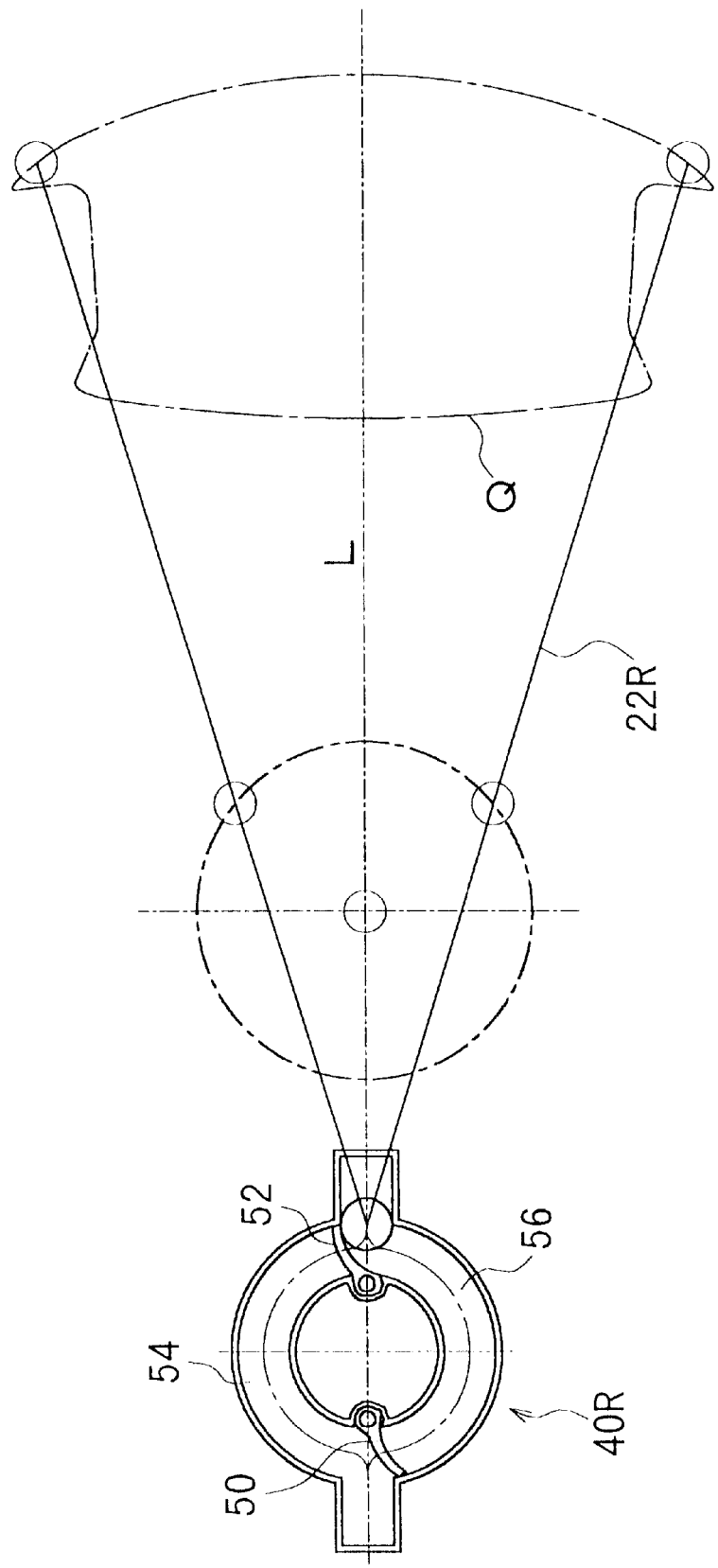
FIG. 26 is a view indicating a locus Q of motion of the pedal in the embodiment as shown in FIG. 25.

FIG. 25 illustrates still further preferred embodiment wherein the sliding part 40R is constructed as an annular-shaped one. In this case, each of the two-way valves 50 and 52 is arranged at a going operation starting side thereof and a returning operation starting side thereof. During the going operation, the upper side valves of the two-way valves 50 and 52 are pushed open to cause the sliding pin 42R to move on the upper half annular part 54. During the returning operation, the lower side valves of the two-way valves 50, 52 are pushed open to cause the sliding pin to move on the lower half annular part 56 and then the sliding pin 42R returns to its original position. FIG. 26 shows a state of starting of returning operation.

With the configuration shown in FIG. 25, the locus Q of motion of the pedal 23R at this time becomes the slightly deformed one as shown in FIG. 26.

Figure 27:
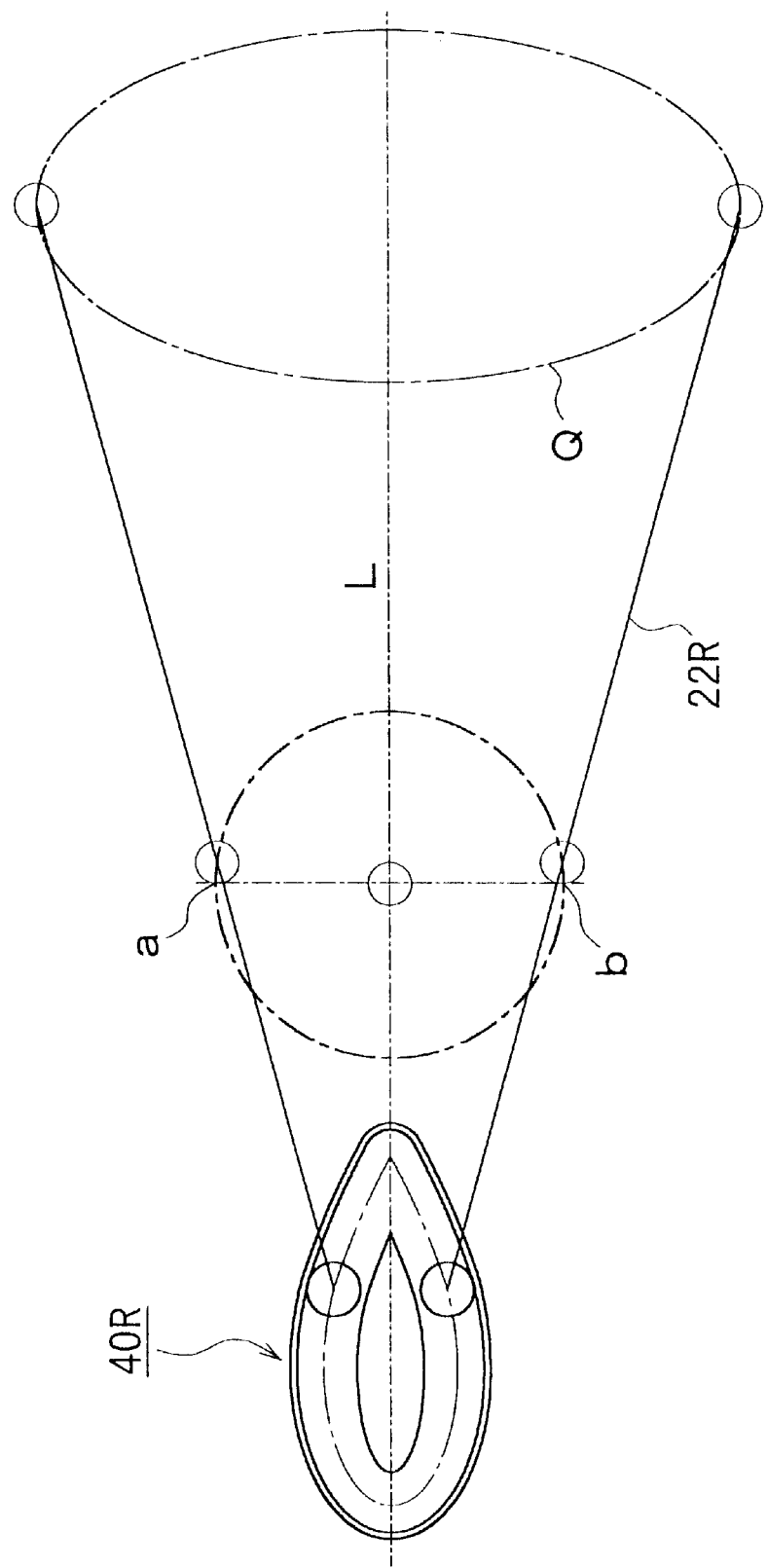
FIG. 27 is a view indicating a locus Q of motion of the pedal according to still further preferred embodiment of the invention wherein the sliding part is formed as a deformed ellipse.

FIG. 27 shows still further preferred embodiment in which the sliding part 40R is formed as a deformed ellipse. The sliding part 4OR having a teardrop shape is laid in a lateral orientation. In this case, as apparent from FIG. 27, the locus Q of motion shows an ellipse of motion and thus, a smooth rotation of the pedal 23R is attained.

Figure 28:
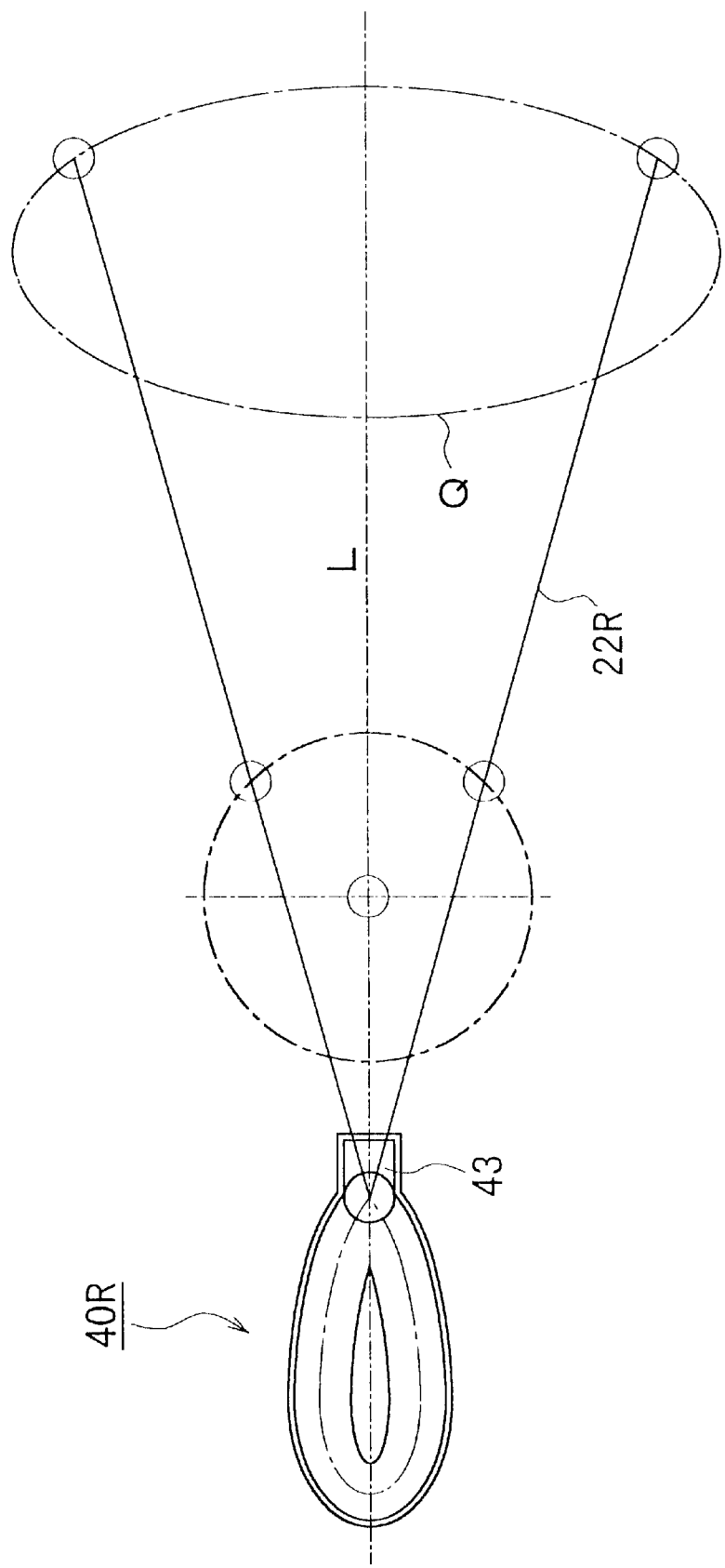
FIG. 28 is a view indicating a locus Q of motion of the pedal according to still further preferred embodiment of the invention wherein a slight linear sliding part is added to the sliding part as shown in FIG. 27.

FIG. 28 shows a modification of the embodiment shown in FIG. 27, wherein a slight linear sliding part 43 is added to the sliding part 40R as shown in FIG. 27. In this case, a sliding stroke when the operation exceeds the upper dead center a toward the lower dead center b, becomes short. This embodiment attains a relative smooth locus Q of motion of the pedal 23R.

Figure 29:
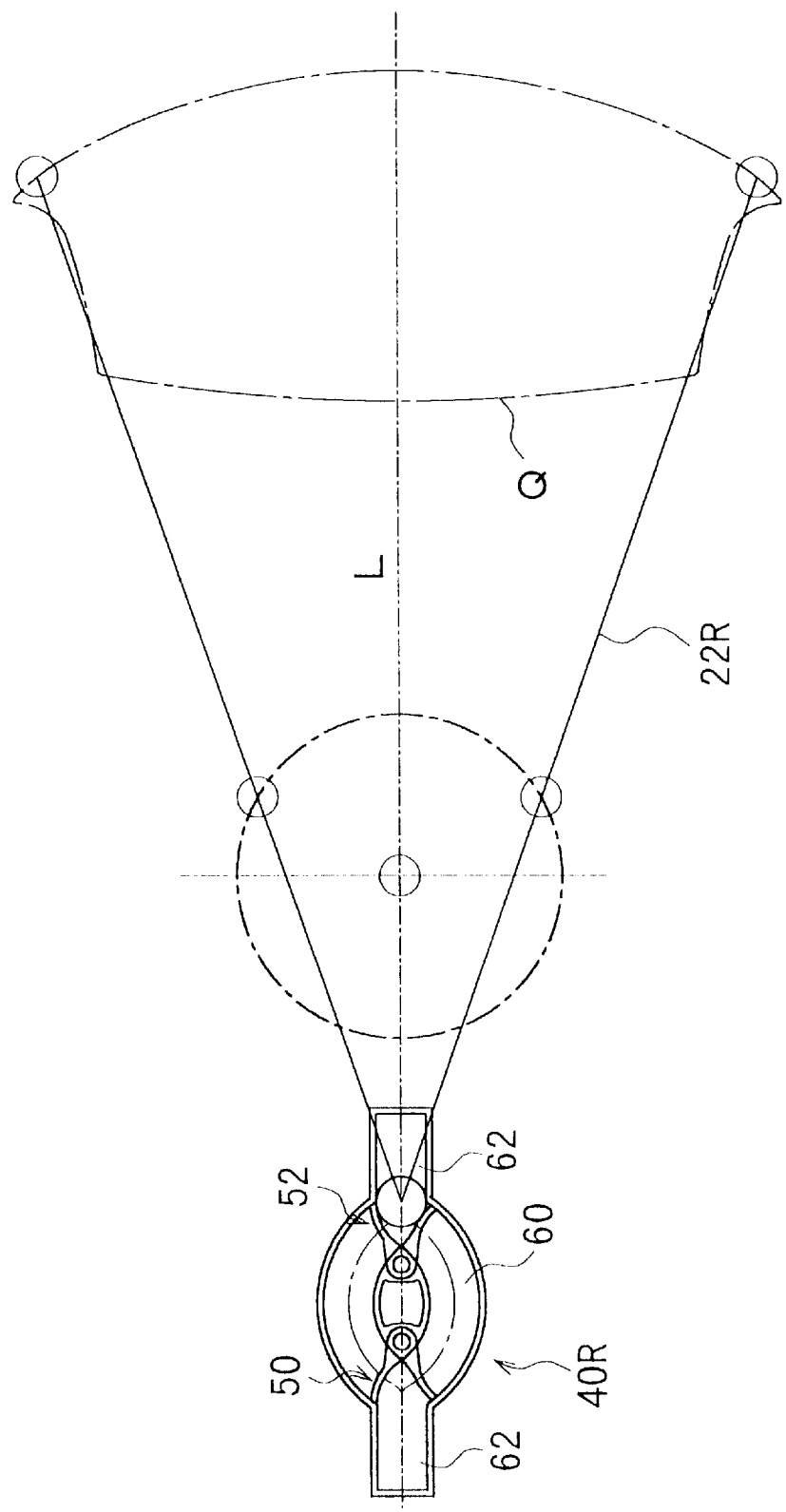
FIG. 29 is a view indicating a locus Q of motion of the pedal according to another preferred embodiment of the invention wherein a sliding part is of a combination of an ellipse annular part and a linear-line part.
Figure 30:
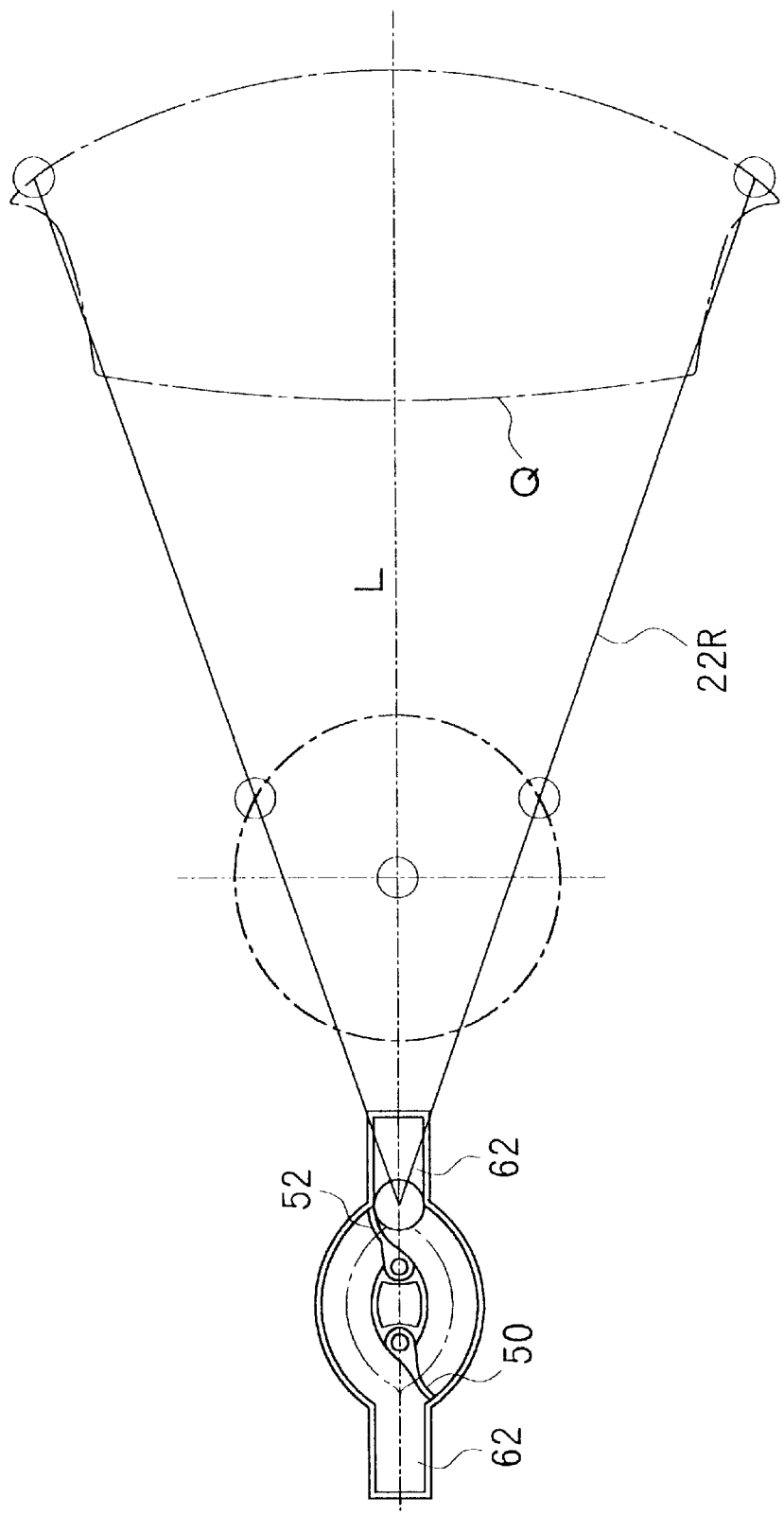
FIG. 30 is a view indicating a locus Q of motion of the pedal in the embodiment as shown in FIG. 29.

A sliding part 40R shown in FIG. 29 is of a combination of an ellipse annular part 60 and a linear-line part 62, wherein a two-way valves 50 and 52 are arranged at a crossing point between the ellipse annular part 60 and the linear-line part 62. In such a configuration, the locus Q of motion under a combination of the locus Q of motion shown in FIG. 25 and the locus Q of motion shown in FIG. 28, is obtained. FIG. 30 illustrates a state of starting the returning operation.

Figure 31:
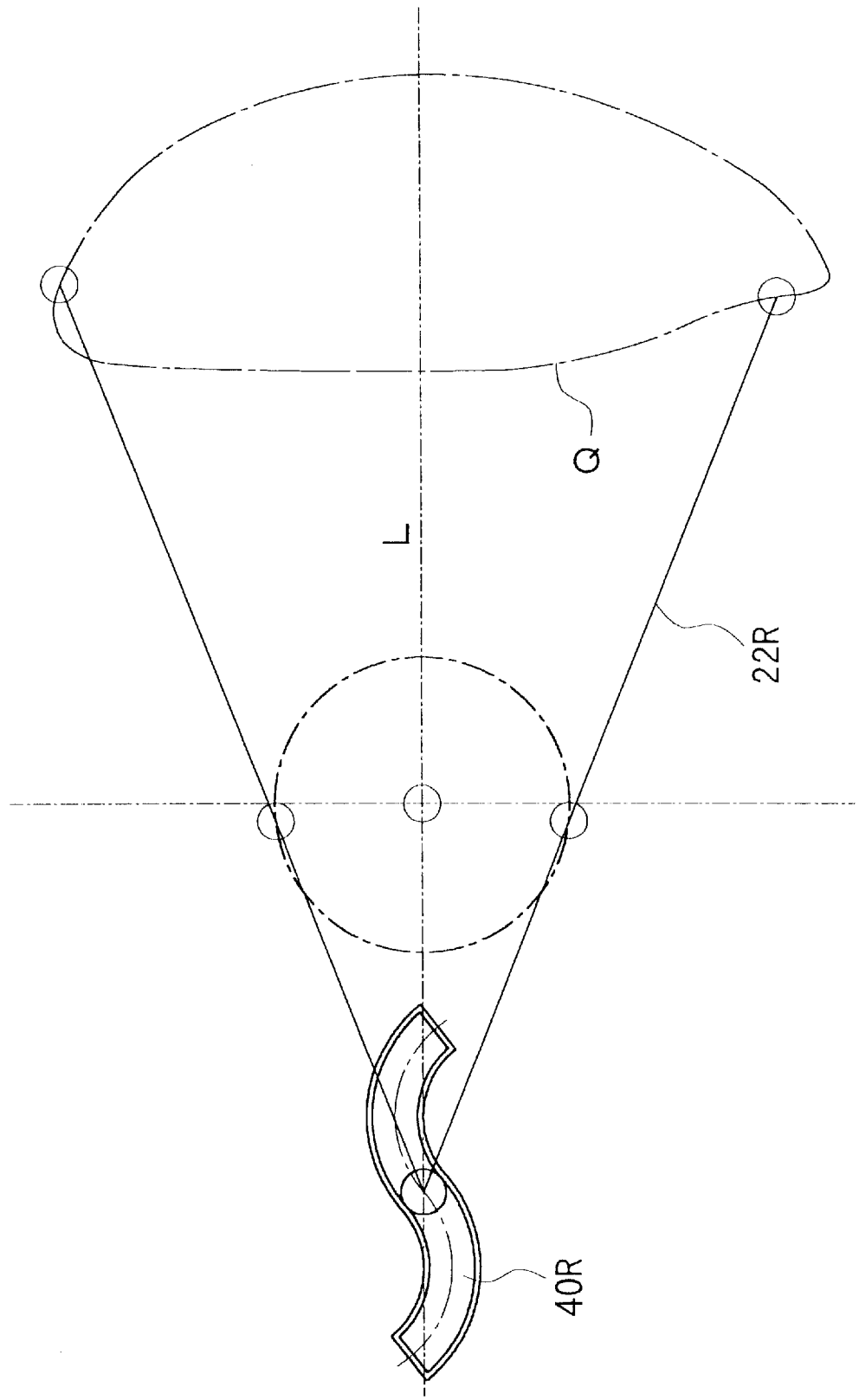
FIG. 31 is a view indicating a locus Q of motion of the pedal according to still another preferred embodiment of the invention wherein the sliding part is formed as an S-shaped one.

FIG. 31 illustrates another preferred embodiment of the invention wherein the sliding part 40R is formed as an S-shaped sliding part 40R. In this case, as shown in this figure, a linear part of the locus Q of motion of the pedal 23R become a slightly deformed locus of motion.

Figure 32:
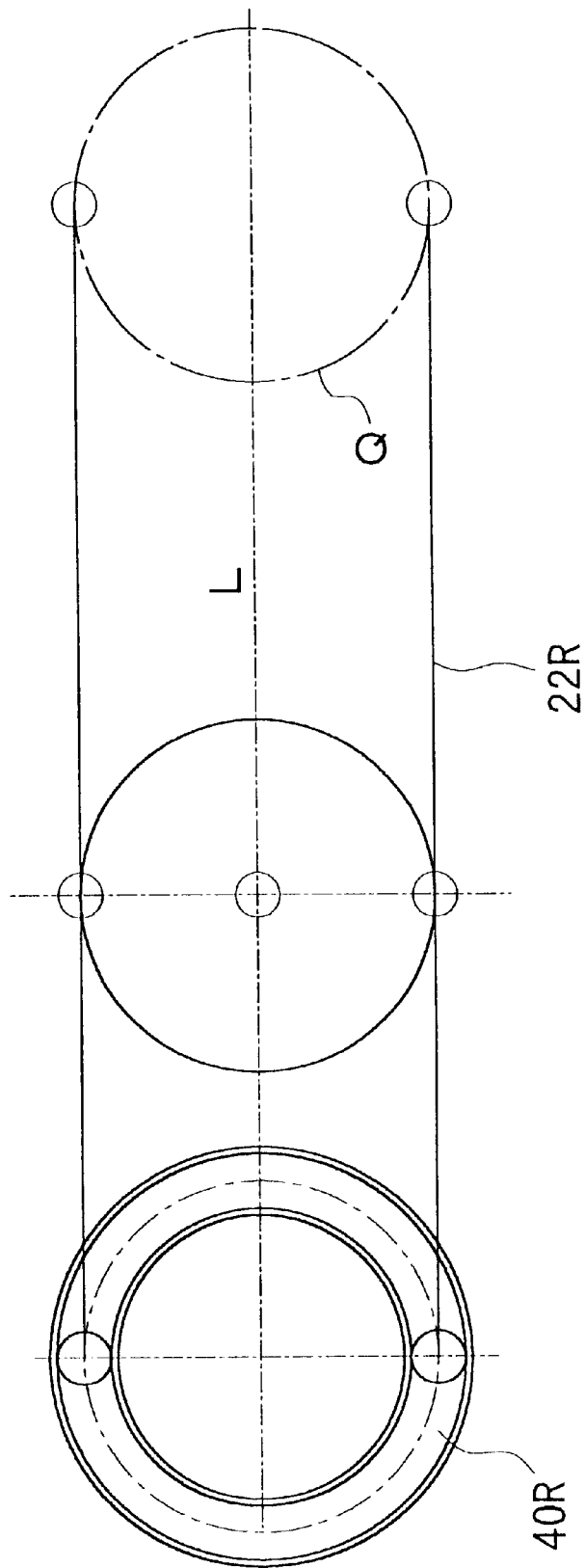
FIG. 32 is a view indicating a locus Q of motion of the pedal according to further preferred embodiment of the invention wherein an annular-shaped sliding part is used.

FIG. 32 indicates further preferred embodiment in which an annular-shaped sliding part 40R is used. In this case, the locus Q of motion of the pedal 23R becomes a complete circle.

Although any of the pedal levers 22R are formed as linear lever in the preferred embodiments shown in FIG. 23 and the subsequent figures, it is also possible to use a bent lever. Although the sliding part 40R is arranged in parallel with the moving wheel axis L in these embodiments, the present invention is not limited to the arrangement of the sliding part 40R.

In addition, as the driving force transmitting means in the aforesaid preferred embodiments, the chain driving system has been illustrated. However, it may be similarly applicable to a bicycle having a belt drive or a shaft drive driving system or the like. The present invention can be applied to a bicycle having an auxiliary driving means installed therein.

In accordance with the present invention, the rider of the bicycle steps on the pedal 23 so that the pedal lever 22 oscillates downwardly. The force applied to the pedal lever 22R is transmitted to the sprocket 26 through the crank lever 30 to cause the sprocket 26 to rotate. Then, the oscillating fulcrum point of the pedal lever 22 is moved, not being fixed, in a lateral direction within the sliding part 40. Rotating force of the sprocket 26 is transmitted to the rear wheel 2 through the chain 27, and then the bicycle 10 can be moved forward.

In accordance with the present invention, the configuration of the rotating force transmitting mechanism for the rear wheel can be simplified. Therefore, it is possible to provide a less-expensive and light weight bicycle in which the configuration of the rotating force transmitting mechanism is made simple and the number of component parts is reduced. Further, when the pedal lever is stepped on, the oscillating fulcrum point is moved smoothly in a lateral direction. Even if the loci of rotating motion of the pedal at the first half period and the second half period are different to each other, the motion of the pedal becomes quite smooth.

As described above, since it is possible to assure the smooth locus of motion of the pedal, the present invention has some advantages that the bicycle can be operated easily. Further, even if an oscillating range of the pedal lever is reduced, sufficient rotating force of the sprocket can be realized.

While the above is a complete description of the preferred embodiment of the invention, various alternatives, modifications and equivalents may be used. Therefore, the above description should not be taken as limiting the scope of the invention as defined by the appended claims.

What is claimed is:

1. A bicycle, comprising:
   a frame;
   a front wheel rotatably arranged at a front side of said frame;

a rear wheel rotatably arranged at a rear side of said frame;

a rotating member carried on said frame;

a driving force transmitting member associated with said rotating member for transmitting rotating force of said rotating member at least one of said front wheel and said rear wheel;

a pair of pedal levers having a phase difference of 180° with respect to each other to oscillate alternatively up and down;

a pedal operatively connected to one of said pair of pedal levers;

a crank lever for transmitting force from said one of said pair of pedal levers to said rotating member;

a sliding pin operatively connected to said one of said pair of pedal levers;

a sliding part providing an oscillating fulcrum point for said one of said pair of pedal levers, said sliding part defining a path of travel for said sliding pin such that at least a portion of said path of travel of said sliding pin is not coincident with an axis formed by a line connecting a wheel shaft of said rear wheel with a shaft of said rotating member;

wherein said sliding pin operatively slides within said sliding part as said one of said pair of pedal levers is oscillated, and force from the oscillation of said one said pair of pedal levers is transmitted to said rear wheel via said rotating member.

2. The bicycle of claim 1, wherein said sliding part defines a path of travel for said sliding pin at an angle with respect to said moving wheel axis.

3. The bicycle of claim 1, wherein said sliding part defines a path of travel for said sliding pin that is bent at a bend point.

4. The bicycle of claim 1, wherein said sliding part defines a path of travel for said sliding pin that is partially linear and partially curved.

5. The bicycle of claim 1, wherein said sliding part defines a path of travel for said sliding pin at a shifted position from said moving wheel axis.

6. The bicycle of claim 1, 2, 3, 4 or 5, wherein said one of said pair of pedal levers is bent.

7. The bicycle of claim 6, wherein said one of the pair of pedal levers is bent upwards.

8. The bicycle of claim 6, wherein said one of the pair of pedal levers is bent downwards.

9. The bicycle of claim 1, 2, 3, 4 or 5 wherein wherein both of said pair of pedal levers are bent.

10. The bicycle of claim 2, wherein said angle of said sliding part is inclined upwards.

11. The bicycle of claim 2, wherein said angle of said sliding part is inclined downward.

12. The bicycle of claim 2, wherein a locus of motion of said pedal is elliptical.

13. The bicycle of claim 12, wherein said locus of motion is inclined.

14. The bicycle of to claim 12, wherein said one of said pair of pedal levers is bent and a locus of motion of said pedal is elliptical.

15. The bicycle of claim 14, wherein said locus of motion of said pedal is inclined.

16. The bicycle of claim 14, wherein said pedal is at a top end position of said elliptical locus of motion when said crank lever achieves a top dead center position.

17. The bicycle of claim 16, wherein said pedal is at a bottom end position of said ellipse when said crank lever achieves a bottom dead center position.

18. The bicycle of claim 3, wherein portions of said sliding part on each side of said bend point are linear.

19. The bicycle of claim 18, wherein the portion of said sliding part on a side of said bend point closer to said front wheel protrudes upwards.

20. The bicycle of claim 18, wherein the portion of said sliding part on a side of said bend point closer to said front wheel protrudes downwards.

21. The bicycle of claim 3, wherein said crank lever achieves a top dead center position when said sliding pin is at said bend point of said sliding part.

22. The bicycle of claim 3, wherein a locus of motion of said first pedal is a combination of ellipse motion and linear motion.

23. The bicycle of claim 3, wherein said one of said pair of pedal levers is bent and a locus of motion of said pedal is a combination of ellipse motion and linear motion.

24. The bicycle of claim 23, wherein said locus of motion of said pedal is inclined.

25. The bicycle of claim 24, wherein said crank lever achieves a top dead center position when said sliding pin is at said bend point of said path of travel.

26. The bicycle of claim 4, wherein said curved path of travel of said sliding pin is towards said front wheel.

27. The bicycle of claim 26, wherein said curved path of travel of said sliding pin protrudes upwards.

28. The bicycle of claim 26, wherein said curved path of travel of said sliding pin protrudes downwards.

29. The bicycle of claim 4, wherein a locus of motion of said pedal is a combination of ellipse motion and linear motion.

30. The bicycle of claim 29, wherein said pedal is at a top end position of said locus of motion when said crank lever achieves a top dead center position.

31. The bicycle of claim 29, wherein said first pedal is at a bottom end position of said locus of motion when said crank lever achieves a bottom dead center position.

32. The bicycle of claim 4, wherein said one of said pair of pedal levers is bent and a locus of motion of said first pedal is a combination of ellipse motion and linear motion.

33. The bicycle of claim 32, wherein said locus of motion of said first pedal is inclined.

34. The bicycle of claim 32, wherein said first pedal is at a top end position of said locus of motion when said crank lever achieves a top dead center position.

35. The bicycle of claim 34, wherein said first pedal is at a bottom end position of said locus of motion when said crank lever achieves a bottom dead center position.

36. The bicycle of claim 5, wherein said path of travel of said sliding pin is at a shifted position above said moving wheel axis.

37. The bicycle of claim 5, wherein said path of travel of said sliding pin is at a shifted position below said moving wheel axis.

38. The bicycle of claim 5, wherein a locus of motion of said pedal is in the shape of a teardrop.

39. The bicycle of claim 38, wherein said locus of motion is inclined.

40. The bicycle of claim 5, wherein said one of said pair of pedal levers is bent and a locus of motion of said pedal is in the shape of a teardrop.

41. The bicycle of claim 40, wherein said locus of motion of said pedal is inclined.

42. A bicycle, comprising:
a frame constituting a chassis;
a front wheel rotatably arranged at a front side of said frame;

a rear wheel rotatably arranged at a rear side of said frame;

a sprocket arranged near a bottom of said frame;

a driving force transmitting means for transmitting rotating force of the sprocket to the rear wheel, and said driving force transmitting means positioned between said sprocket and said rear wheel;

a pair of pedal levers having a phase difference of 180° with respect to each other to oscillate alternatively up and down;

a first pedal operatively connected to one of said pair of pedal levers, and a second pedal operatively connected to the other of said pair of pedal levers;

a crank lever for transmitting force of one of said pair of pedal levers to said sprocket, said crank lever arranged between said sprocket and said one of the pair of pedal levers;

a sliding pin operatively connected to said one of said pair of pedal levers; and a sliding part for acting as an oscillating fulcrum point of said one of the pair of pedal levers, said sliding part defining a path of travel for said sliding pin such that said path of travel is at an angle with respect to an axis formed by a line connecting a wheel shaft of said rear wheel with a shaft of said sprocket, wherein said sliding pin is slid within said sliding part as said one of the pair of pedal levers is oscillated, and force from the oscillation of said one of the pair of pedal levers is transmitted to said rear wheel through said sprocket.

43. The bicycle of claim 42, wherein said angle of said path of travel of said sliding pin is inclined upwards.

44. The bicycle of claim 42, wherein said angle of said path of travel of said sliding pin is inclined downwards.

45. The bicycle of claim 42, wherein a locus of motion of said first pedal is elliptical.

46. The bicycle of claim 45, wherein said locus of motion is inclined.

47. The bicycle of claim 42, wherein both of said pair of pedal levers are bent.

48. The bicycle of claim 47, wherein said pair of pedal levers are bent upwards.

49. The bicycle of claim 47, wherein said pair of pedal levers aare bent downwards.

50. The bicycle of claim 47, wherein a locus of motion of said first pedal is elliptical.

51. The bicycle of claim 50, wherein said locus of motion of said first pedal is inclined.

52. The bicycle of claim 50, wherein said first pedal is at a top end position of said elliptical locus of motion when said crank lever achieves a top dead center position.

53. The bicycle of claim 52, wherein said first pedal is at a bottom end position of said ellipse when said crank lever achieves a bottom dead center position.

* * * * *